United States Patent
Wirrig et al.

(10) Patent No.: US 8,258,929 B2
(45) Date of Patent: Sep. 4, 2012

(54) ENCODING A RFID RECORD MEMBER ON A MOVING WEB

(75) Inventors: Richard D. Wirrig, Centerville, OH (US); Jeanne F. Duckett, Franklin, OH (US); Lance D. Neuhard, New Carlisle, OH (US); John F. Feltz, Fairborn, OH (US)

(73) Assignee: Avery Dennison Corporation, Pasadena, CA (US)

( * ) Notice: Subject to any disclaimer, the term of this patent is extended or adjusted under 35 U.S.C. 154(b) by 1259 days.

(21) Appl. No.: 12/020,122

(22) Filed: Jan. 25, 2008

(65) Prior Publication Data
US 2009/0189770 A1    Jul. 30, 2009

(51) Int. Cl.
*G08B 13/14* (2006.01)
(52) U.S. Cl. .............. 340/10.51; 340/10.5; 340/10.1; 340/572.1; 340/572.8; 235/432; 235/438
(58) Field of Classification Search .......... 340/10.1, 340/10.2, 10.3, 10.4, 10.5, 10.51, 572.1, 340/572.3, 572.7, 572.8; 235/432, 438, 451, 235/452
See application file for complete search history.

(56) References Cited

U.S. PATENT DOCUMENTS

| | | | |
|---|---|---|---|
| 4,408,906 A | 10/1983 | Wallace | |
| 4,719,855 A * | 1/1988 | Cannon et al. | 101/485 |
| 5,081,458 A | 1/1992 | Meunier | |
| 5,524,993 A | 6/1996 | Durst | |
| 5,833,377 A | 11/1998 | Keller et al. | |
| 5,850,187 A | 12/1998 | Carrender et al. | |
| 6,104,291 A | 8/2000 | Beauvillier et al. | |
| 6,246,326 B1 | 6/2001 | Wiklof et al. | |
| 6,327,972 B2 | 12/2001 | Heredia et al. | |
| 6,409,401 B1 | 6/2002 | Petteruti | |
| 6,481,907 B2 | 11/2002 | Banach | |
| 6,677,852 B1 | 1/2004 | Landt | |
| 6,848,616 B2 | 2/2005 | Tsirline | |
| 6,899,476 B1 | 5/2005 | Barrus et al. | |
| 6,922,173 B2 | 7/2005 | Anderson | |
| 6,943,678 B2 | 9/2005 | Muirhead | |
| 7,180,627 B2 | 2/2007 | Moylan et al. | |
| 7,190,270 B2 | 3/2007 | Brown et al. | |
| 7,439,858 B2 | 10/2008 | Feltz et al. | |
| 2001/0029857 A1 | 10/2001 | Heredia et al. | |
| 2004/0100381 A1 | 5/2004 | Waters | |
| 2004/0178267 A1 | 9/2004 | Tsirline | |
| 2005/0058483 A1 | 3/2005 | Chapman | |
| 2005/0116034 A1 | 6/2005 | Satake et al. | |
| 2005/0274800 A1 | 12/2005 | Chapman et al. | |
| 2005/0280537 A1* | 12/2005 | Feltz et al. | 340/572.1 |

(Continued)

FOREIGN PATENT DOCUMENTS

JP    8-124356    5/1996

(Continued)

*Primary Examiner* — Nabil Syed
(74) *Attorney, Agent, or Firm* — Avery Dennison Corporation

(57) ABSTRACT

A system and method for encoding and printing RFID record members with a continuous moving web is provided. In particular, a printer such as a RFID printer is capable of encoding an inlay or multiple inlays within a record member while the web is continuously moving. While a record member is being encoded on a moving web, the record member may be printed upon when a leading edge of a record member reaches the print position.

30 Claims, 19 Drawing Sheets

U.S. PATENT DOCUMENTS

| | | |
|---|---|---|
| 2006/0104689 A1 | 5/2006 | Marowski et al. |
| 2006/0202800 A1* | 9/2006 | Ohashi et al. ............... 340/10.1 |
| 2006/0221363 A1* | 10/2006 | Roth et al. .................... 358/1.6 |
| 2007/0152901 A1* | 7/2007 | Hockey et al. ................ 343/793 |
| 2007/0200710 A1 | 8/2007 | Feltz et al. |
| 2008/0074269 A1* | 3/2008 | Torchalski et al. ........ 340/572.4 |
| 2008/0303722 A1 | 12/2008 | Feltz et al. |

FOREIGN PATENT DOCUMENTS

| | | |
|---|---|---|
| JP | 2003-140548 | 5/2003 |
| JP | 2003-1405648 | 5/2003 |
| JP | 2003208573 | 7/2003 |
| JP | 2002-0275391 | 4/2004 |
| JP | 2005-107991 | 4/2005 |
| JP | 2005-186567 | 7/2005 |
| JP | 2005-5186567 | 7/2005 |
| JP | 2006-000936 | 1/2006 |
| JP | 2006-004150 | 1/2006 |
| JP | 2007-213298 | 8/2007 |
| WO | WO2005028203 | 3/2005 |

* cited by examiner

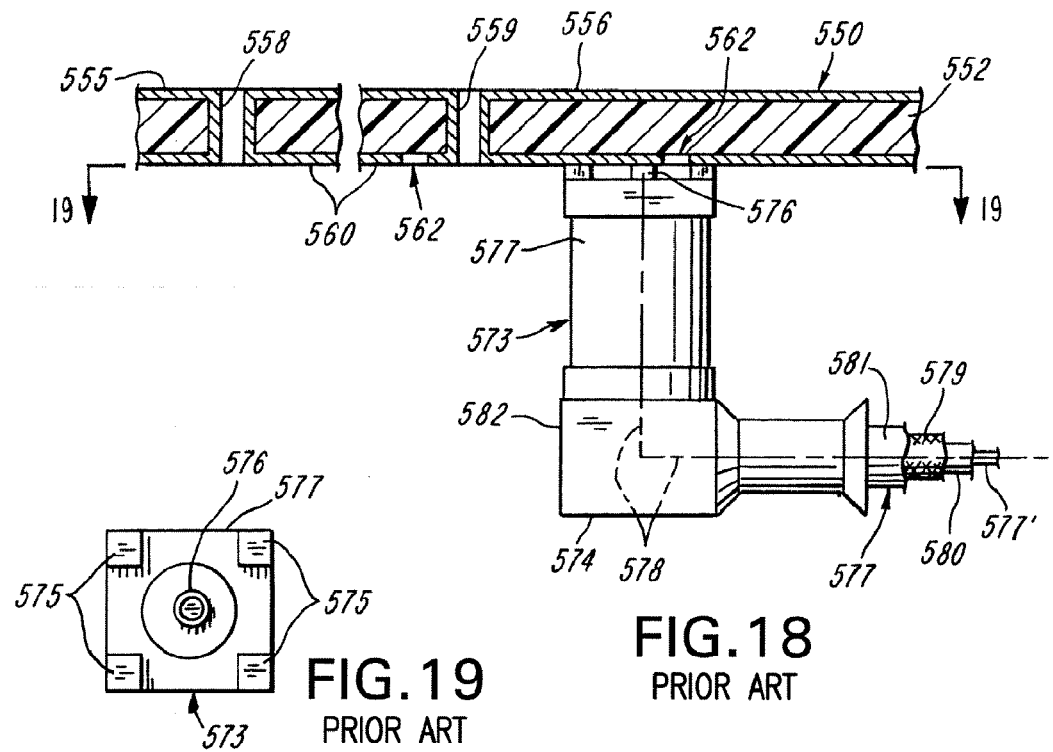
FIG. 18 PRIOR ART
FIG. 19 PRIOR ART
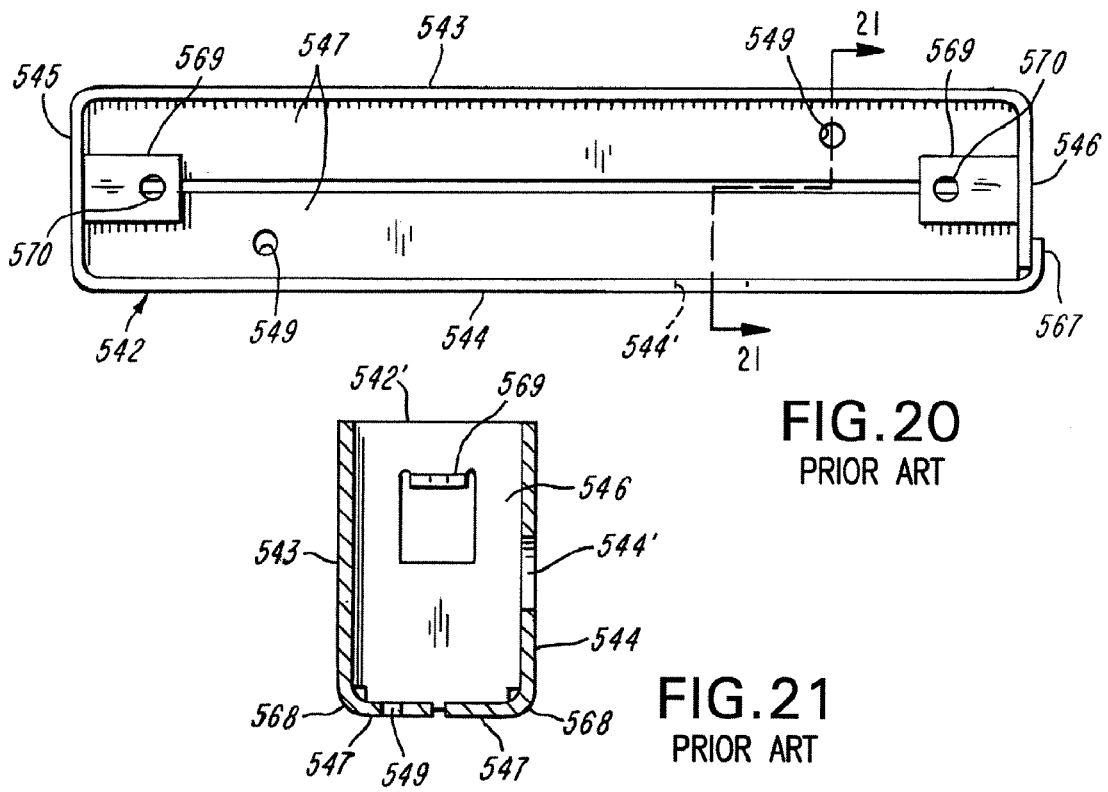
FIG. 20 PRIOR ART
FIG. 21 PRIOR ART

ENCODING A RFID RECORD MEMBER ON A MOVING WEB

CROSS REFERENCE TO RELATED APPLICATIONS

A related U.S. application is co-owned application Ser. No. 11/789,109, filed Apr. 23, 2007.

FIELD OF THE INVENTION

The invention relates to RFID printers and antennas. More particularly, the invention concerns the ability to operate a RFID printer such that a RFID inlay may be encoded while a web including records continues in motion.

BACKGROUND

RFID (Radio Frequency Identification) transponders have been embedded in record members to track inventory. The data contained in the transponder is typically read by a stationary RFID read module as the inventory with the RFID transponder is carried past the stationary read module on a conveyor belt or the like. Similarly, stationary RFID write modules are typically used to write data into the RFID transponder. RFID printers are now required to be capable of both printing on record members, such as labels, tags etc., and capable of writing to and/or reading from a RFID transponder contained on the record member.

Currently, record members containing RFID transponders are encoded using printers having stepper motors. Typically, a web including record members is momentarily stopped so that the RFID transponder or inlay in a record may be encoded and the record member printed thereafter.

However, stopping of a web to encode a RFID transponder increases the amount of time for overall job completion and limits overall throughput of the printer. Therefore, there is a need in the art for an improvement to the printing and encoding of RFID record members particularly for record members being printed in batch processes.

In addition, in the printer depicted in application Ser No. 10/873,979, the printing position is where the print head could print on the record member. In the case of the depicted thermal printer, the printing position is at the nip where the print head cooperates with the platen roll and the record member. Printing occurs while the web is moving.

To print and RFID encode a relatively long record member, the print head can be at the printing position at the top of form or start of the record member adjacent its leading edge and printing can commence there or at a later time further from the leading edge of the record member. The movement of the web is stopped when the record member reaches the place where the transponder is to be RFID encoded. After RFID encoding, the printing of that record member can commence and continue until the web has advanced to the top of form position on the next adjacent upstream record member at which point the advance of the web ceases, and so on. With continued reference to relatively long labels, the next adjacent upstream record member was not encountered until after the record member has been completely printed and the print head has reached the top of form position of the next adjacent upstream record member, the print head is completely off the just printed and RFID encoded record member. Accordingly, none of the area of the record member is unprintable.

However, relatively short record members of, for example, one inch (2.54 cm) or less could be only partially printed and RFID encoded. Only part of the area of the record member could be printed because the distance between the antenna and the printing position is too great. Accordingly, while one relatively short record member has reached a position where its transponder can be RFID encoded, the print head is still on the immediately adjacent downstream record member. Accordingly, there can be no additional printing on the partially printed and RFID encoded downstream record member because it was not possible to print on one record member and RFID encode a different record member.

In addition, a prior art antenna design is detailed below in this background section along with the use of FIGS. 10-21. Improvements to the antenna design which correspond to various aspects of the following invention are described in the detailed description portion of this application. Further information on the prior art antenna design is described in co-owned U.S. application Ser. No. 10/873,979, filed Jun. 22, 2004 which is incorporated in its entirety.

With reference to FIG. 10, there is shown a prior art antenna system with an antenna assembly generally indicated at 540 disposed in the printer 40 (FIG. 1) between the web guide 62 (FIG. 1) and the platen roll 63. The antenna assembly 540 is mounted on a conductive shield 501. An inclined portion 503' of a section 501' has two laterally spaced holes 541 (only one of which is shown). The holes 541 are aligned with threaded holes 548. The antenna assembly 540 has an electrically conductive metal enclosure or shield generally indicated at 542 having side panels or side walls 543, 544, 545 and 546 and bottom or back panels 547. While the conductive shield 542 is composed of metal, the shield 542 can be constructed of molded or fabricated non-conductive plastics material which has a conductive coating such as would be created by vacuum metalizing or plating, wherein the plating is in conductive contact with the shield 501 and antenna 550. The enclosure 542 can also be constructed of a conductive plastics material, if desired. The side panels 543 through 546 terminate at an open top 542'. One bottom panel 547 has the threaded holes 548. The panels 547 are closely spaced or they can touch each other and constitute a back wall or back panel. Screws 549 pass through respective holes 541 and are threaded into the threaded holes 548 to hold the antenna assembly 540 securely and electrically connected to the inclined portion 503' of the shield 501. The shield portion 503' supports the antenna assembly 540 so that a microstrip or microstrip antenna 550, discussed below, is generally parallel to the web C and the plane of the RFID transponder T. The enclosure 542 is electrically grounded to the metal printer frame 72 through the shield 501.

With reference to FIGS. 10, 11 and 13, the prior art antenna assembly 540 includes the microstrip antenna 550 and the shield 542. The antenna assembly 540 is shown in FIG. 1 to be located at the write and/or read station. The shield 542 acts to direct the energy radiated from the antenna 550 to the region above opening 542'. This reduces the energy that is seen by the RFID transponders T located upstream and downstream from the RFID transponder located over or adjacent to the antenna 550. The shield 542 is electrically connected to conducting elements 553, 554 and 560 by screws 571 received in through plated-through holes 557 and threaded holes 570 (FIG. 17). The elements 553 and 560 are electrically connected to each other by plated-through holes 558. The conductive elements 553, 554, 556 and 560 are formed on a non-conducting substrate 552. The driven element of the antenna 550 is the microstrip 556. The resonant frequency of the antenna 550 is mainly determined by the length of the microstrip 556. The antenna assembly 540 is mounted on the shield portion 503', with the plane of the microstrip antenna 550 being parallel to the web C. The main part of the antenna 550 is the driven element 556, the length of which is selected to be approximately a quarter wavelength of the desired resonant frequency of the antenna. The plane of the antenna 550 is shown to be generally parallel to the web C and the microstrip element 556 extends parallel to and in the same direction as the generally flat chip-containing transponder T in the web C. If desired, the antenna assembly 540 can be used to write to and/or read a transponder T which is at a different orientation such as perpendicular to the element 556, as contrasted to the parallel orientation of the transponder T shown in FIG. 2. The top of the shield or enclosure 542 or the opening 542' is nominally spaced from the web C by 3.0 millimeters. The upper surface or first face of the antenna 550 is spaced 5.62 millimeters from the top of the enclosure or opening 542'. Microstrip antenna 550 parameters such as resonant frequency, bandwidth and driving point impedance can be changed by changing the length of element 556, the size and dielectric constant of the substrate 552, the width of element 556, and distance between holes 558 and 559. The beam width of the antenna assembly 540 is determined mainly by the position of the antenna 550 in the enclosure 542. The antenna 550 is operable in the ultra high frequency (UHF) range. Element 556 is 41.5 millimeters long and 5 millimeters wide, providing resonance at 915 MHz and broad band operation. The shield 542 also functions as a support or housing for the antenna 550.

With reference to FIG. 12, there is shown what can be described as a first face of the antenna 550, with FIG. 13 showing the second face. The antenna 550 is comprised of a printed circuit board 551 having the non-conductive substrate 552 with conductive portions or elements generally indicated at 553, 554 and 560. The conductive portions 553 and 554 preferably have peripheral edges or a boundary spaced inwardly from the side edges of the substrate 552 so they cannot contact the inside surfaces of the shield 542. The conductive portion 553 has a generally rectangular portion or element 555 with a narrow strip or driven element 556 extending from the rectangular conductive portion 555 toward but spaced from the portion 554. It is noted that the antenna of this embodiment can be formed without the conductive portion 554. The rectangular portion 555 of the portion 553 and the portion 554 have conductively plated-through holes 557, one of which is illustrated in greater detail in FIG. 17. The area 555 has four small, spaced, conductively plated-through holes 558 and the element 556 has one small, conductively plated-through hole 559, as shown in an enlarged scale in FIGS. 14 and 18. In this preferred embodiment, the hole 559 is 5.0 millimeters from the centerline of the holes 558 and the centerline of the holes 558 is 1.5 millimeters from the place where the element 556 joins the portion 555.

FIG. 13 shows that the second face is plated with a conductor 560, except for the marginal edges 561 and an area 562 best shown in FIG. 15. The conductor 560 forms a ground plane that extends substantially throughout the second face of the substrate 552, underlying the strip 556. This ground plane contributes to the directivity of the energy radiated from the strip 556 toward the transponder T. The conductor-free marginal edge 561 prevents the conductor 560 from contacting the inside surfaces of the shield 542. By spacing the elements 554, 555 and 560 from the enclosure 542, it assures that the only electrical connection of the antenna 550 to the enclosure 542 is through the screws 571. This assures that the characteristics of the antenna 540 are not affected by contact of elements 553, 554 and/or 560 with the conductive enclosure 542 at one or more other locations. A conductive area generally indicated at 563 is completely surrounded by conductor-free area 562. The conductive area or conductor 563 has a generally circular conductive portion 564 joined by a conductive bridge 566 to a generally circular conductive portion 565 which surrounds the plated-through hole 559. It is apparent that the conductive portion 565 is electrically connected to the microstrip element 556 through the plated-through hole 559 as best shown in FIG. 18.

With reference to FIGS. 16 and 20 through 21, the shield or enclosure 542 is shown to be comprised of a single piece of conductive metal such as aluminum, bent into the shape illustrated. With reference to FIG. 11, the panel 544 has a bent end portion 567 which overlaps the outside of the panel 546. The panel 544 has a hole 544' through which the cable 577 passes. The spaced bottom panels 547 are joined to the side panels 543 and 544 at bends 568. Bent-in tabs 569 have threaded holes 570. The antenna 550 is supported by the tabs 569. As best shown in FIG. 17, one of the screws 571 extends through a star washer 572 and the plated-through hole 557 and is threaded into the hole 570 in the tab 569. The screws 571 insure that the conductive portions 554, 555 and 560 make good electrical contact with the tabs 569 which are part of the shield 542.

With reference to FIGS. 18 and 19, there is shown a jack generally indicated at 573 and a plug 574 connected thereto, however, FIG. 19 shows only the end of the jack 573. The jack 573 is of the surface-mount type and has four short square pins or feet 575 and has a short central pin 576 electrically isolated from body 577 and the pins 575 of the jack 573. Further details of the jack 573 and the plug as disclosed in specification sheets of Johnson Components, Waseca, Minn. entitled "MMCX-50 Ohm Connectors" and MMCX Straight Jack Receptacle, Surface Mount. The pin 576 of the plug 574 is connected to a conductor 577' of the cable 577 as shown by dot-dash line 578. The conductor 577' is electrically insulated from a braided shielding conductor 579 by insulation 580. The cable 577 is electrically insulated from contact with other printer parts by an insulator 581. The conductor 579, the body 582 of the plug 574, the body 577 of the jack 573, and the pins 573 are all connected electrically, and the plug 574 and the jack 573 are mechanically snap-connected.

The four pins 575 of the jack 573 are soldered to the copper-plated conductor 560, and the pin 576 is soldered to the circular portion 564 of the conductor 563. With reference to FIG. 15, the position of the four pins 575 is shown by phantom line squares 575P. A circuit path exists between the pin 576 and the conductor portion 556 through the conductor 563 and the plated hole 559.

By way of further example, not limitation, the substrate 552 is 18 millimeters in width, 95 millimeters in length and 1.57 millimeters in thickness; the enclosure or shield 542 is 104 millimeters in length from the outside of the wall 545 to the outside of the wall 546, 20.7 millimeters in width from the outside of the wall 543 to the outside of the wall 544, and 34 millimeters in height from the outside of the wall provided by panels 547 and the opening 542'; the thickness of bent sheet metal that comprises the panels 543, 544 545, 546, and 547 is 1.2 millimeters; the distance from the web guide 60 and the platen roll 63, namely the space available for the antenna assembly 500 or the antenna assembly 540 is about 24.65 millimeters; and the distance from the microstrip element 556 to the inside surface of the bottom panels 547 is 27.18 millimeters. The distance from the nip between the print head 69 and the platen roll 63 to terminal end of the guide 510 (FIG. 10) is 8 millimeters.

The following additional patent documents and other literature are made of record and may or may not be prior art: U.S. Pat. Nos. 4,408,906; 5,524,993; 5,833,377; 6,246,326; 7,180,627; 7,190,270; U.S. Publication No. 2001/0029857;

U.S. Publication No. 2004/0100381; U.S. Publication No. 2005/0116034; U.S. Publication No. 2005/0274800; U.S. Publication No. 2005/0280537; U.S. Publication No. 2006/0104689; U.S. Publication No. 2006-0221363; Abstract of Japan Publication No. 2003-140548; Abstract of Japan Publication No. 2004-110994; Abstract of Japan Publication No. 2005-107991; Abstract of Japan Publication No. 2005-186567; Abstract of Japan Publication No. 2006-000936; Abstract of Japan Publication No. 2007-213298; Abstract of Japan Publication No. 2006-004150; and Abstract of Japan Publication No. 2008-124356.

SUMMARY

In accordance with various aspects of the invention, the disadvantages of prior printers as discussed above have been overcome. One aspect of the present invention is that the inlay or inlays are not required to be at a predetermined position relative to the leading edge of a record member. In an embodiment of the invention, a printer such as a RFID printer is capable of encoding an inlay or multiple inlays within a record member while the web is continuously moving. In another aspect of the invention, while a record member is being encoded on a moving web, the record member may be printed upon when a leading edge of a record member reaches the print position. In an embodiment, the printing and encoding of a record member may be started and/or completed nearly simultaneously.

In another embodiment of the invention, where smaller record members are to be encoded and printed, a first encoded record member may be printed upon when it reaches a print position as a second succeeding record member is being encoded.

In yet another aspect of the invention, a record member containing an inlay may be encoded while the web is in motion whether the record member is shorter than the distance from print head to an index sensor or equal or longer.

In a further aspect of the invention, a printer may down-speed the web motion based on a determination that a requested speed does not allow for encoding while web is in motion at the requested speed.

In another aspect of the invention, a calibration sequence can determine, given a current inlay RF power setting, the length and location of an RF field. In an embodiment, a RFID printer includes an antenna system that is discriminating enough so that RFID transponders at closely spaced locations along a web of printable record members may be read from and/or written by a read and/or write station on a one-by-one basis without being affected by or affecting an adjacent RFID transponder.

In an additional aspect of the invention, a label-save feature may be incorporated into various embodiments of the invention.

In a further aspect of the invention, a record member with a RFID inlay may be marked as non-encodable so that when the record member reaches a print position the proper recovery is determined.

In a further aspect of the invention, the average RF field length may be calculated by measuring the RF field for every record member. In this way, manufacturing tolerances may be readily taken into account.

In an embodiment, a RFID printer may include a RFID reader/writer and an index sensor. The index sensor may be configured to detect a leading edge of a RFID record member. An antenna may be coupled to the RFID reader/writer to read and/or write to a RFID transponder. The RFID printer may further include a printing system having a print head and a drive mechanism to drive a web of RFID record members past the print head for printing data. In addition, the RFID printer includes a processor which may be operable to encode and print on the RFID record member as the web containing the RFID record member continues in motion.

It is with the purview of the invention to provide a printer and method in which an RFID record member can be RFID encoded and fully printed is without any unprintable or dead areas, and RFID encoded. This is accomplished by RFID encoding the transponder in the record member before or during the time the record member is printed. To accomplish this the RF field is accessed earlier than in the prior art printer of application Ser. No. 10/873,979 by directing the RF field further upstream of the printing position to thereby allow more time for the RFID record member to be RFID encoded. The "printing position" is at the nip where the dot line of the print head cooperates with the platen roll and the record member in a thermal printer or where the print head prints on a record member in a printer such as an ink jet printer.

BRIEF DESCRIPTION OF THE DRAWINGS

These and other advantages and novel features of the present invention, as well as details of an illustrated embodiment thereof, will be more fully understood from the following description and drawings.

FIG. 18 is an enlarged prior art fragmentary sectional view showing a connector for connecting a shielded conductor to the antenna of FIG. 16 in accordance with an aspect of the invention.

FIG. 19 is a prior art fragmentary top plan view showing only the upper portion of the connector taken along line 19-19 of FIG. 18 in accordance with an aspect of the invention.

FIG. 20 is a prior art top plan view of the shielding enclosure in accordance with an aspect of the invention.

FIG. 21 is a prior art sectional view taken along line 21-21 of FIG. 20 in accordance with an aspect of the invention.

DETAILED DESCRIPTION

Figure 1:
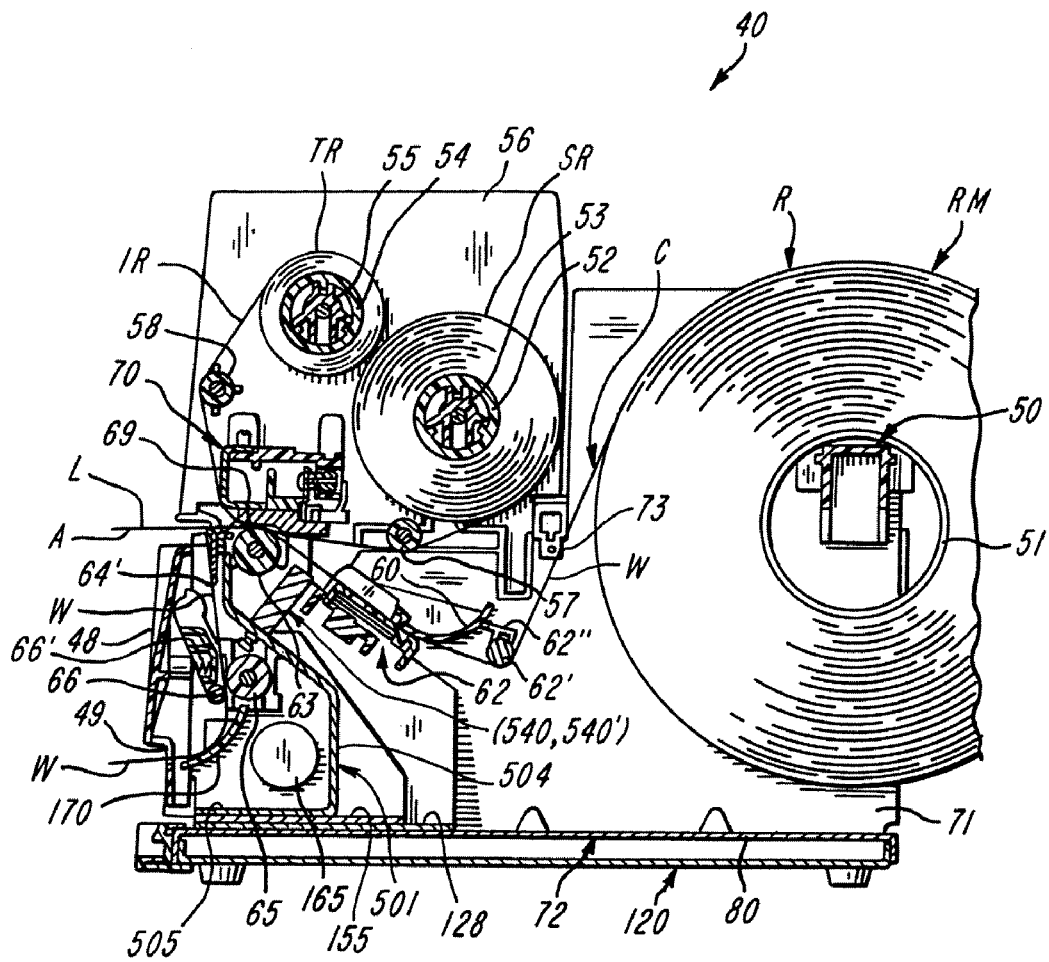
FIG. 1 is a sectional view of a RFID printer in accordance with an aspect of the invention.

With reference initially to FIG. 1, there is shown a printer generally indicated at 40 which is essentially the same as the printer 40 disclosed in U.S. patent application Ser. No. 10/873,979, the disclosure of which is incorporated herein by reference, except as otherwise disclosed herein. While the invention is illustrated in connection with a thermal printer using dot heating elements to create images such as bar codes, graphics, alpha numeric characters and the like, the invention is also useful with printers such as ink jet, laser, xerographic, impact, and other types of printers. In the following description, the terms transponder and inlay are interchangeable. In addition, more than one inlay or transponder may be included in a record member.

Figure 2:
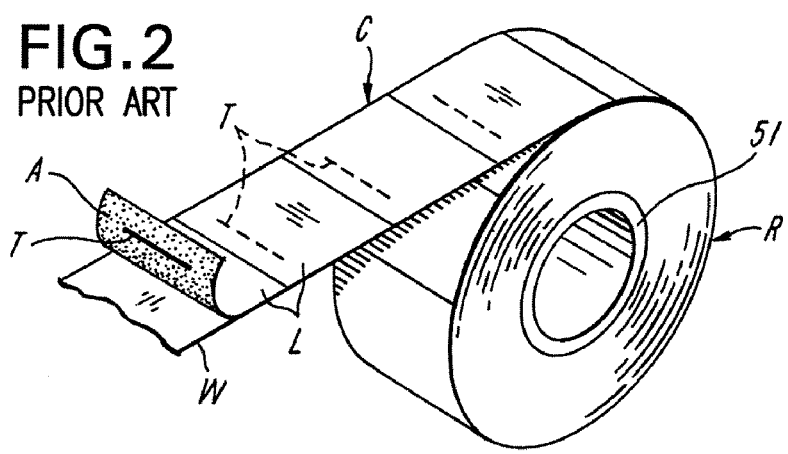
FIG. 2 is a perspective view of a prior art roll of web labels containing RFID transponders.
Figure 4:
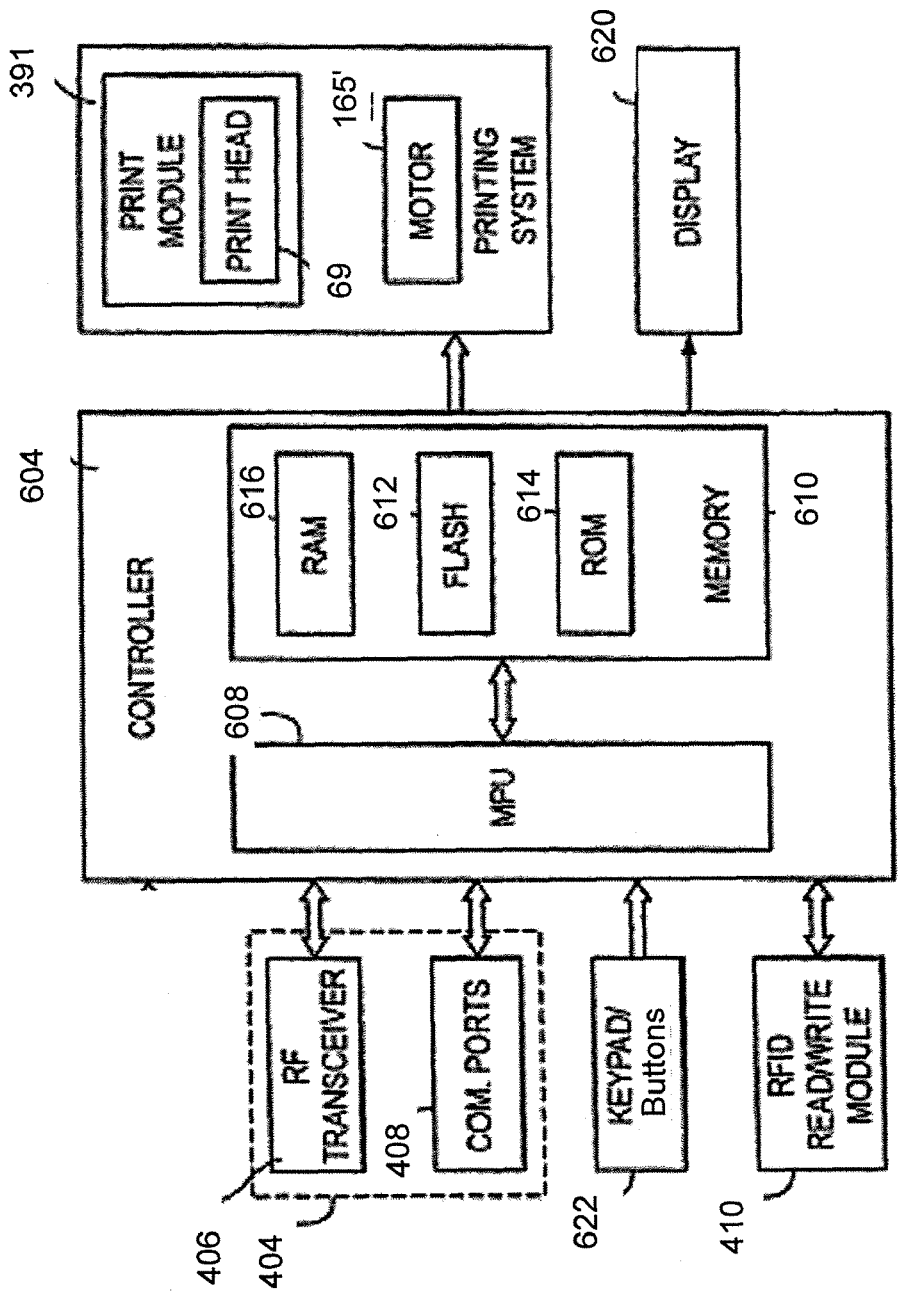
FIG. 4 illustrates a control block diagram for a RFID printer in accordance with an aspect of the invention.
Figure 10:
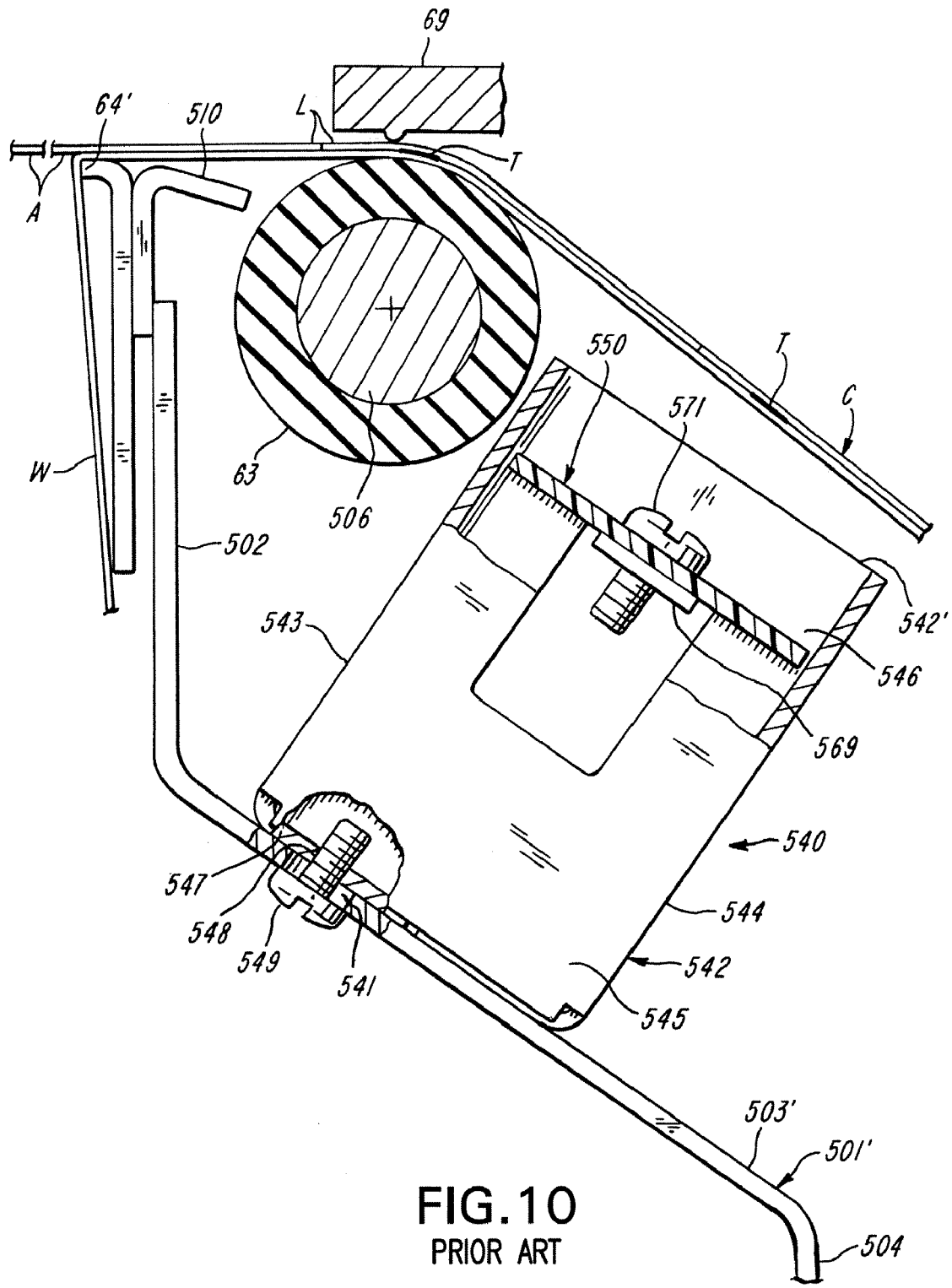
FIG. 10 is a prior art sectional view showing an antenna assembly in accordance with an aspect of the invention.
Figure 11:
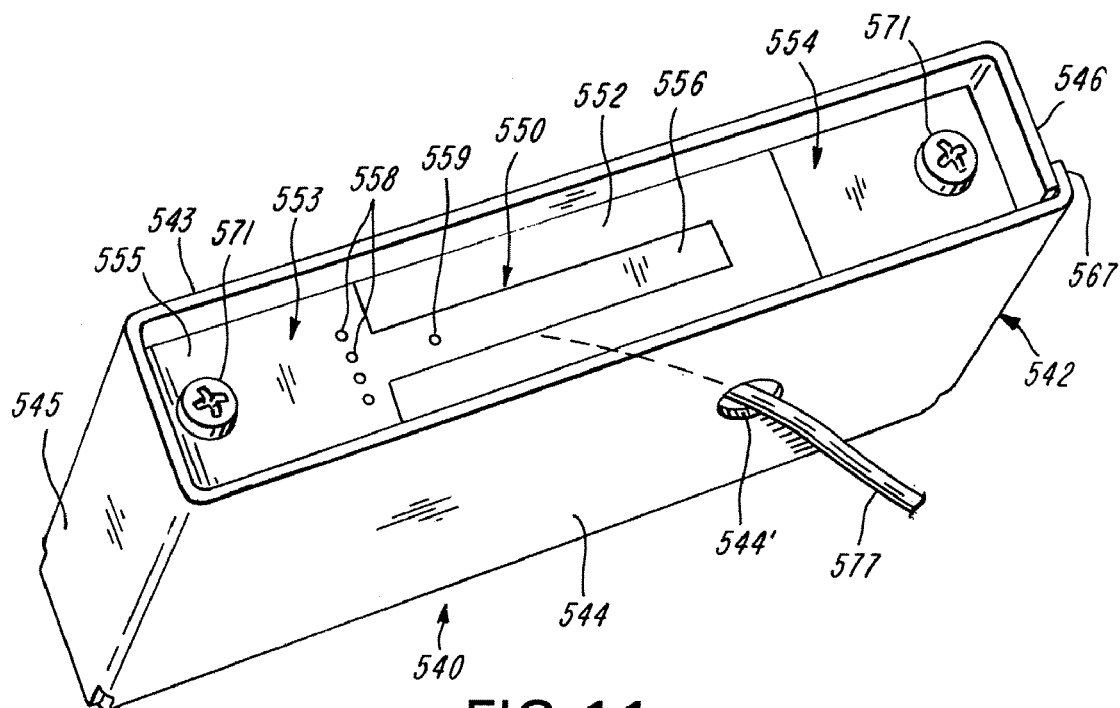
FIG. 11 is a prior art perspective view of the antenna assembly depicted in FIG. 10 in accordance with an aspect of the invention.
Figure 12:
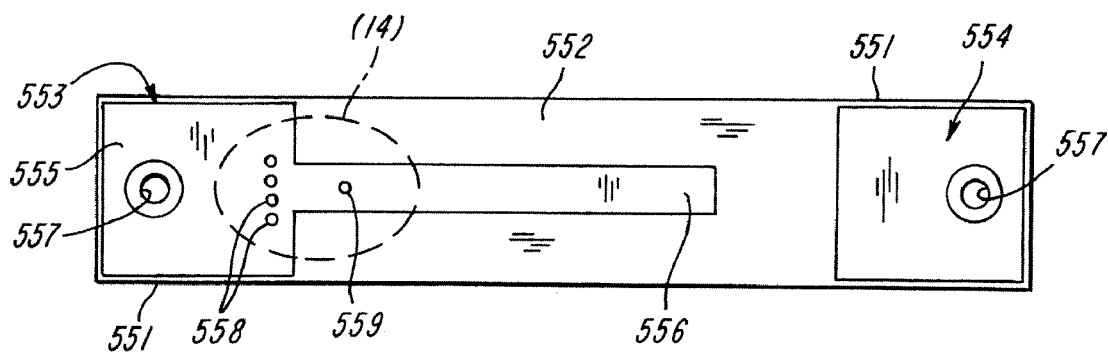
FIG. 12 is a prior art top plan view of the antenna assembly depicted in FIGS. 10 and 11 in accordance with an aspect of the invention.
Figure 13:
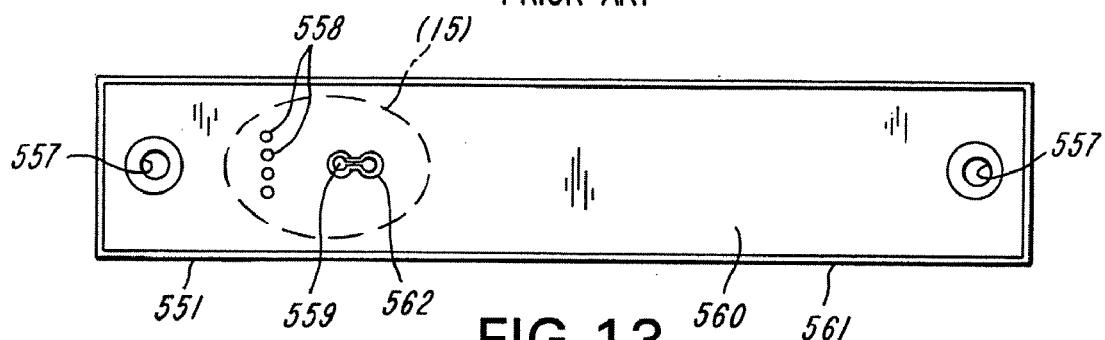
FIG. 13 is a prior art bottom view showing the ground plane of the antenna depicted in FIGS. 10 through 12 in accordance with an aspect of the invention.
Figure 14:
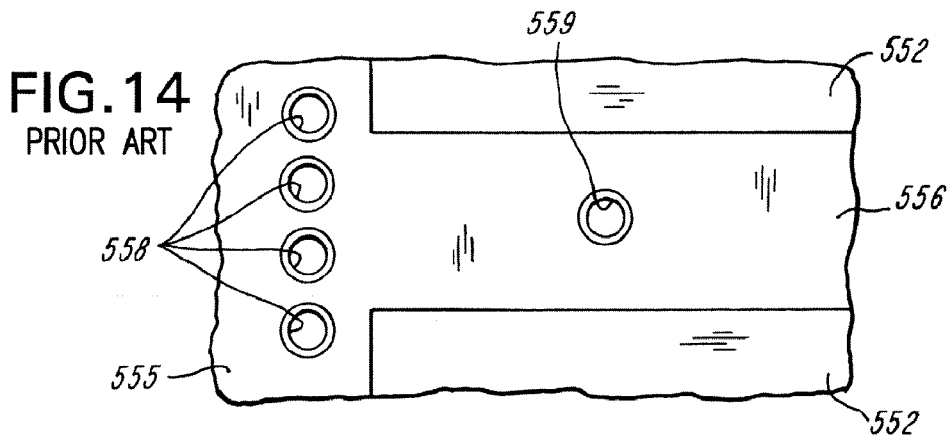
FIG. 14 is an enlarged prior art view of the encircled portion (14) of the antenna shown in FIG. 12 in accordance with an aspect of the invention.
Figure 15:
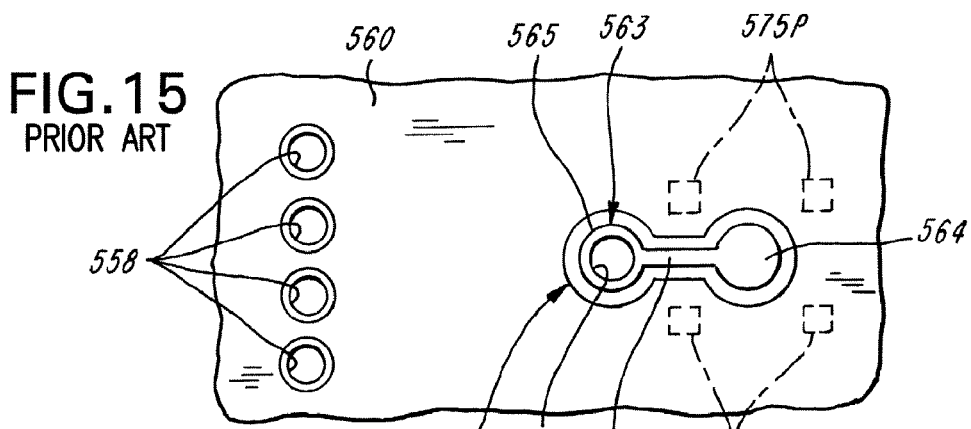
FIG. 15 is an enlarged prior art view of the encircled portion (15) of the antenna shown in FIG. 13 in accordance with an aspect of the invention.
Figure 16:
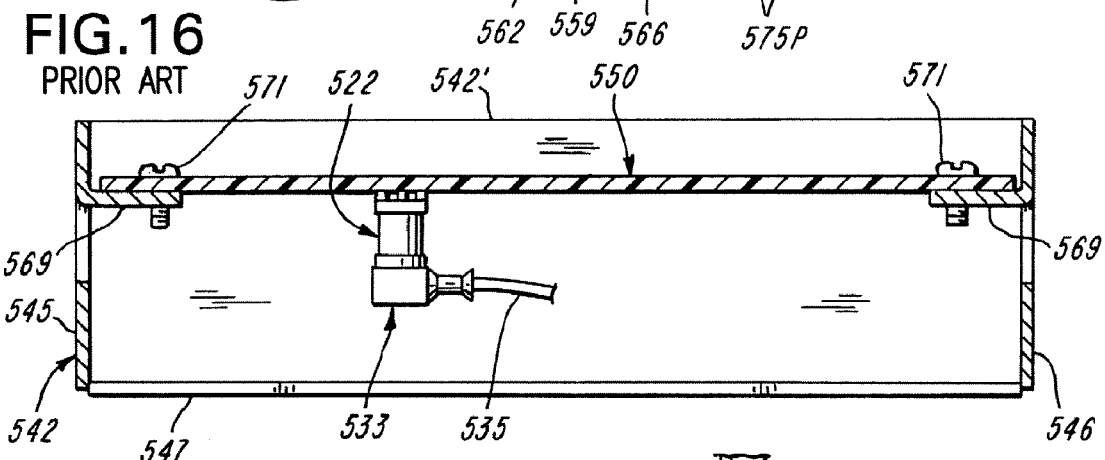
FIG. 16 is a prior art sectional view of the antenna assembly shown in FIGS. 10 and 11 in accordance with an aspect of the invention.
Figure 17:
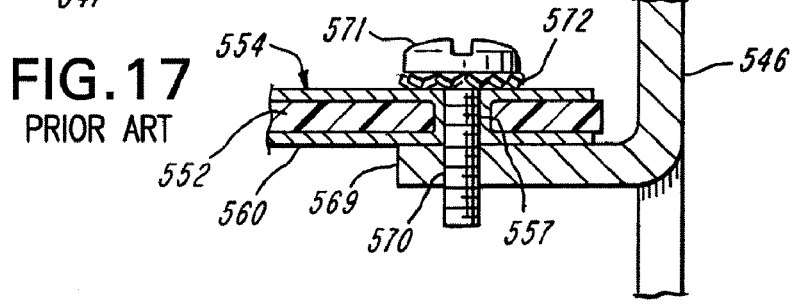
FIG. 17 is a prior art fragmentary sectional view showing the manner the antenna is mounted to a shielding enclosure or shield in accordance with an aspect of the invention.
Figure 22:
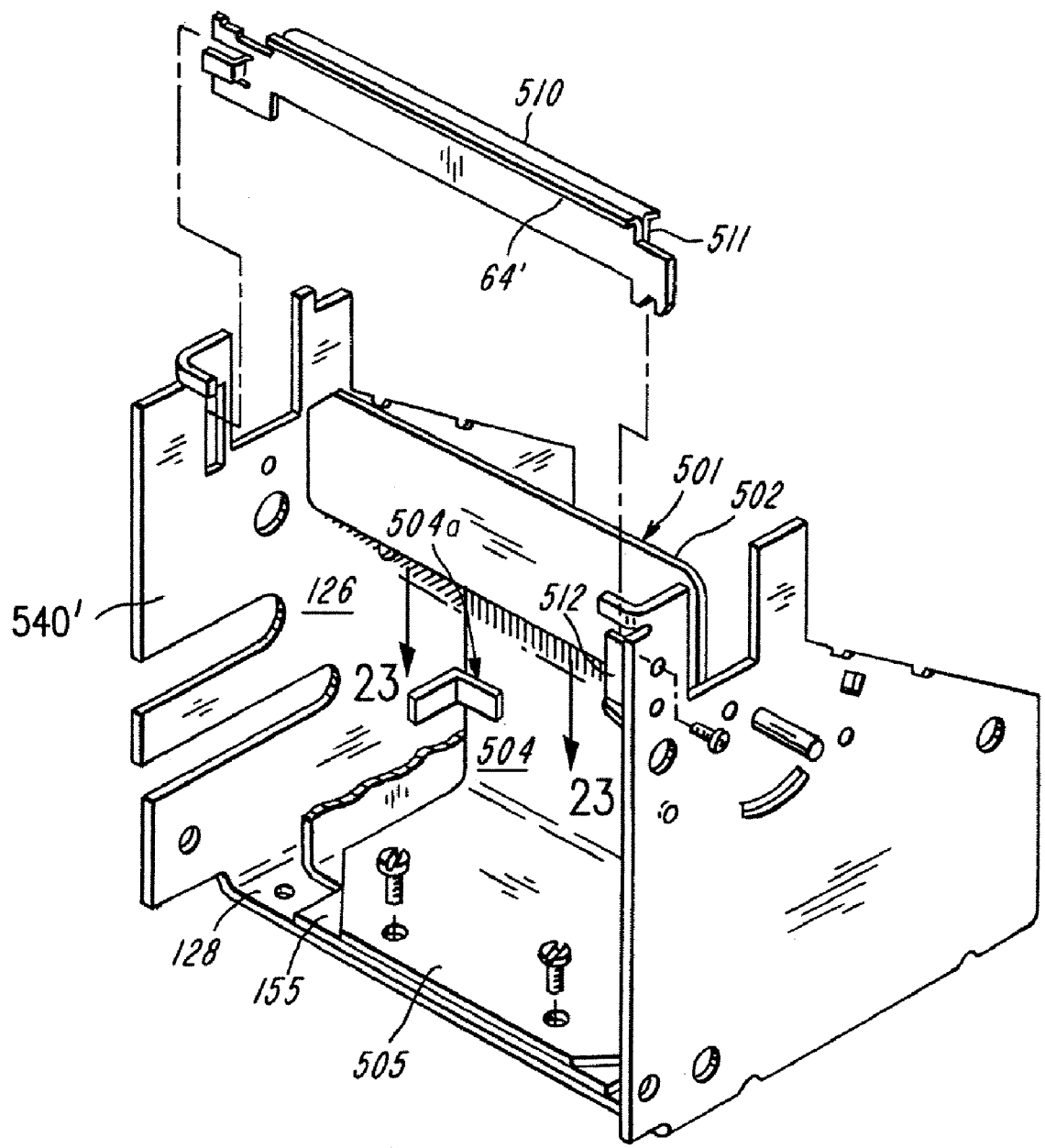
FIG. 22 is a partially exploded, modified, perspective view of the printer frame, shielding and peel structures in accordance with an aspect of the invention.
Figure 23:
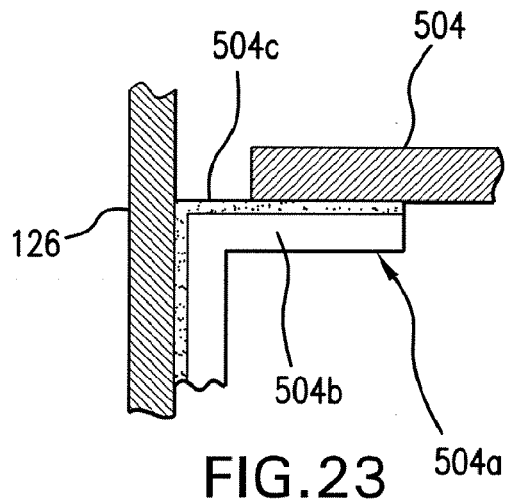
FIG. 23 is a sectional view taken generally along line 23-23 of FIG. 22 in accordance with an aspect of the invention.

The printer 40 has a generally vertical frame panel 71 and a conductive metal horizontal frame member 72 on a conductive metal base plate 120. A movable mounting member 56 is pivotally mounted to the frame plate 71 about hinge blocks 73 (only one of which is shown in FIG. 1). A roll mounting member 50 is shown to mount a roll R of a web C of record members RM. The record members RM are illustrated to comprise a composite label web C which comprises a carrier web W to which a series of pressure sensitive labels L are releasably adhered by pressure sensitive, tacky, adhesive A (FIG. 2). If desired, the web of record members RM can be comprised of, for example, a web of fabric labels, tags or forms. The web C is shown to be paid out of the roll R and passes beneath a guide roller 62' rotatably mounted by a bracket 62" to a guide member 60 which is part of a web guide generally indicated at 62. Any suitable web guide, for example, just a member with a curved surface or a roller can be used instead, if desired. From there the web C passes between a thermal print head 69 which is part of a print head assembly 70 and a platen roll 63. It is noted the web C extends from the roll R to a position upstream of the nip of the print head 69 and the platen roll 63 and extends downstream beyond the nip. The record members RM could alternatively be in a fanfold arrangement. The platen roll 63 may contain a conductive metal shaft 506 (FIG. 10) about which a tubular elastomeric sleeve is received. The shaft 506 may act as an RF reflector. If desired, the shaft 506 can be made of a rigid plastics material which is not RF reflective. A delaminator in the form of a peel bar 64' is provided downstream and preferably adjacent the nip. However, the delaminator can alternatively comprise a peel roller. A label L can be delaminated at the delaminator 64' when the web W is advanced by a motor 165 between a motor-driven roll 65 and a back-up roll 66. The motor 165 helps to advance the web from delaminator 64' in a downstream direction. The platen roll 63 may be driven by motor 165' (FIG. 4). A spring 66' is used to urge the backup roll 66 toward the roll 65 so that the web W is pressed between the rolls 65 and 66. From there the carrier web W passes about an arcuate guide plate 170 and through an exit opening 49 of a movable panel 48.

The illustrated printer 40 utilizes an ink ribbon IR wound into a supply roll SR. The supply roll SR has a core 52 and the core 52 is mounted on a spindle 53. The ink ribbon IR is paid out of the supply roll SR and passes beneath a ribbon guide 57 to the nip between the print head 69 and the platen roll 63 and from there the ink ribbon IR passes partially about a guide 58 and onto a take-up roll TR. The take-up roll TR has a core 54 identical to the core 52. The core 54 is mounted on a spindle 55 identical to the spindle 53.

With continued reference to FIG. 1, each of the record members R include a RFID transponder T incorporated in a composite web C of labels L as best shown in prior art FIG. 2. A typical transponder includes an integrated circuit chip and an antenna. As shown in FIG. 2, the roll R mounted on core 51 includes RFID labels L. Each label L is illustrated to have a RFID transponder T adhered to the adhesive A on the underside of the label L. Thus, the composite label web C has a RFID transponder T sandwiched between the label L and the carrier web W. The RFID transponder T in a preferred embodiment is a passive transponder that uses received RF energy to power the chip of the transponder T and enabling functions of reading and/or writing when sufficient energy is received by the transponder T so that information can be read or written to, i.e., programmed into, the RFID transponder. The pitch or length of a record member RM is the distance from the leading edge of one record member RM to the leading edge of an adjacent record member RM in the longitudinal direction of the web.

Figure 2A:
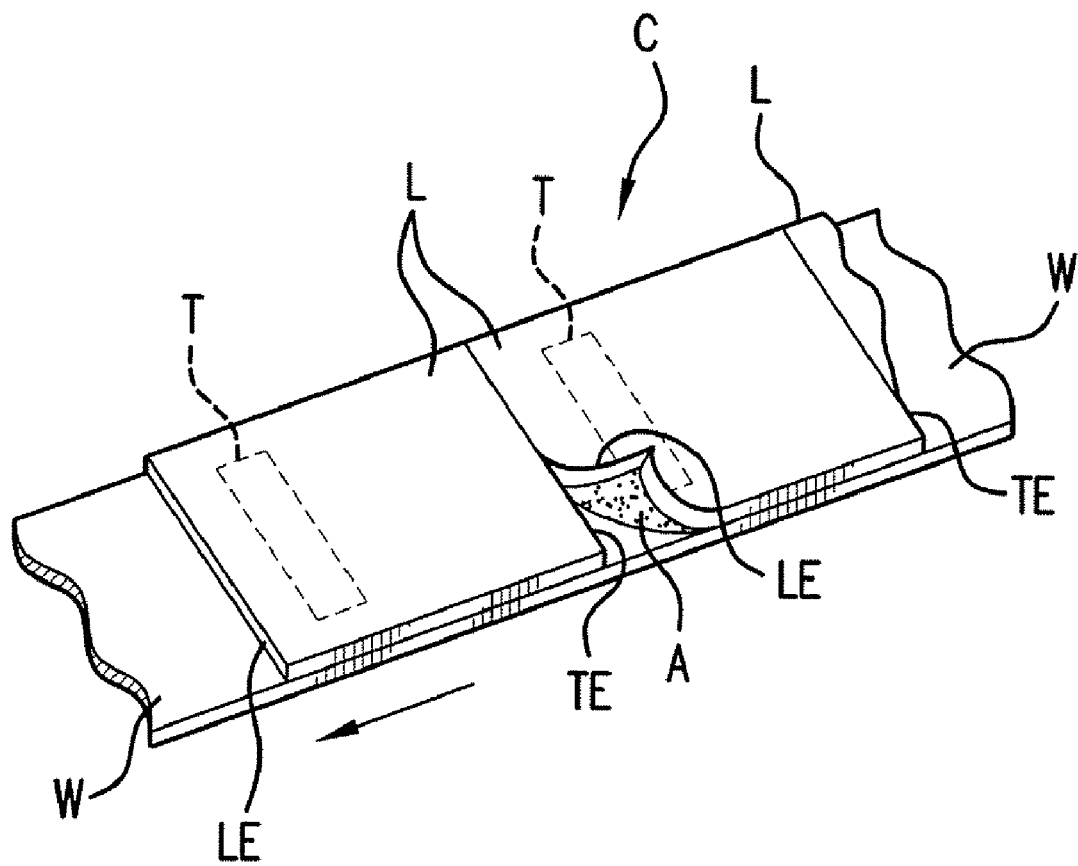
FIG. 2A is a perspective view of a prior art labels containing RFID transponders.

FIG. 2A illustrates a perspective view of prior art labels L containing RFID transponders T. Each label as illustrated in FIG. 2A may contain a transponder T. In addition, each label L also includes a leading edge LE and trailing edge TE.

FIG. 1 also shows an antenna assembly 540 fitted between the web guide 62 and the platen roll 63. The shield or RF reflector generally indicated at 501 extends into contact with an electrically conductive metal delaminator in the form of a peel edge 64' which forms part of the shield. The shield 501, which is preferably comprised of conductive metal such as steel, has the inclined portion 503' (FIG. 10), a downwardly extending portion 502 joined to the inclined portion 503', a downwardly extending portion 504 and a base portion 505 grounded to the frame 120. The motor 165 is below the inclined portion and above the base portion 505. The platen roll 63 is above the inclined portion 503'. The inclined portion 503' of the shield 501, in one preferred embodiment, supports the antenna assembly 540. The second portion 502 of the shield 501 extends at an angle from the support portion 503' and towards the web C so that a part of the shield 501 is adjacent the web C to shield a RFID transponder in an adjacent record member RM that is downstream of the shield 501, i.e., a record member RM that is past the shield 501 in the direction of web movement, from energy radiated from the antenna 550. The second portion 502 of the shield 501 is formed integrally with the portion 503' supporting the assembly 540. Alternatively, the second shield portion 502 may include multiple parts. For example, the portion of the shield 501 adjacent to the web includes an electrically conductive metal web guide 510 with a downwardly extending portion that abuts and makes intimate electrical contact with shield portion 502. The portion of the shield 501 adjacent the web C may also include the delaminator 64' as discussed below.

Figure 3:
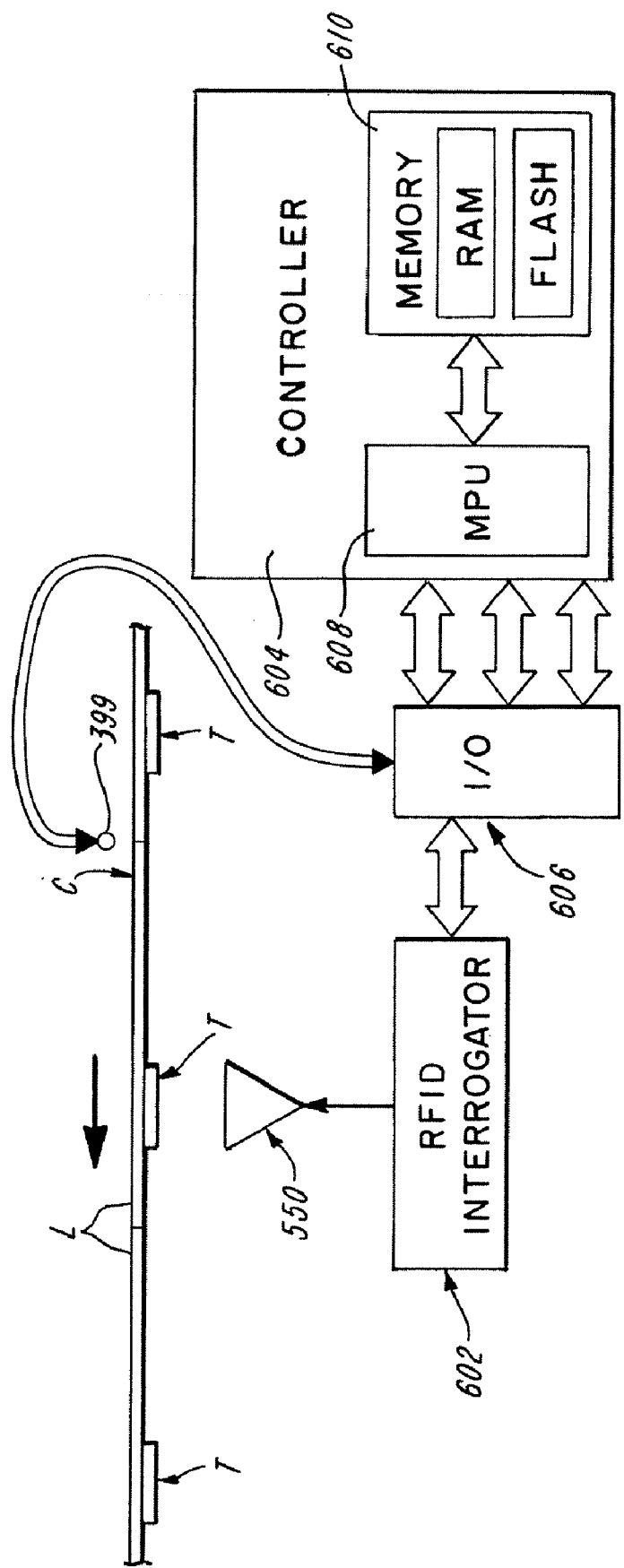
FIG. 3 is a block diagram of a RFID read/write station and an index sensor for use with a RFID printer in accordance with an aspect of the invention.

FIG. 3 shows the antenna 550 to be located at a write and/or read station in accordance with an aspect of the invention. In FIG. 3, the antenna assembly 550 radiates energy in a narrow beam towards an adjacent RFID transponder T, that is aligned with the antenna 550. The RFID antenna 550 radiates energy in response to a RFID module or interrogator 602 in order to write to or program the adjacent RFID transponder. The RFID interrogator 602 is responsive to a controller 604 to drive the antenna 550 to write or program particular information into the adjacent RFID transponder T and the interrogator 602 is responsive to energy picked up by the antenna 550 from the RFID transponder T to read information stored on the transponder T.

In an aspect of the invention, the RFID interrogator 602 is coupled to the controller 604 by a RFID input/output interface 606, the interrogator 602 receiving or sending communication signals through the interface 606 and the interrogator 602 receiving power via the interface 606. In an embodiment, the illustrated communication line between the interrogator 602 and the I/O interface 606 may represent the use of numerous different communications protocols such as serial communication, parallel communications, or other communication protocols. In another embodiment, the illustrated communication line between the interrogator 602 and the I/O interface 606 may represent a general purpose input/output hardware line. In yet another embodiment, the single illustrated communication line may represent a bundle of two-way communications lines. The illustrated communication line may be used to tell the interrogator 602 to search for transponders T. Additionally, the communication line may communicate various instructions to the interrogator 602 including a power-up command or the sending of a trigger to encode the transponder. A response from the interrogator 602 may be received by the controller 604 through a different communication line than the one used to issue a command from controller 604. The controller 604 includes a microprocessor 608 and memory 610. The memory 610 may include a RAM for storing data and an application program and a flash EEPROM for storing software controlling the printer 40.

In an embodiment, the interrogator 602 may have the ability to pre-stage data before a transponder is in position for encoding. Next, the printer module 606 may send a trigger to the RFID reader/writer module 410 or RFID interrogator 602 using a communication line to write to the RFID transponder.

In addition, FIG. 3 also includes an index sensor 399 which is coupled to I/O 606. The index senor 399 may detect a leading edge LE (FIG. 2A) of a label L in accordance with an aspect of the invention. In another aspect of the invention, index sensor 399 may also detect a trailing edge TE (FIG. 2A) of label L. The expression "RF field" means that an RFID transponder can be read and/or written to. In an embodiment, the index sensor 399 may be positioned so that it remains external to any RF field generated by the above described antenna assemblies. The index sensor 399 will detect the leading edge LE of the record member RM before RF detection.

FIG. 4 illustrates a control block diagram in accordance with an aspect of the invention. In FIG. 4, a printer may include a number of input devices. The input devices may include a communication interface 404. In an embodiment, the communication interface 404 includes a radio frequency transceiver 406 and/or one or more communication ports 408 such as a RS 232 port, a serial port, USB port, firewire port, an infrared port, a parallel port, etc. . . . The communication interface 404 may allow the printer 40 to communicate with a host device to receive data therefrom or to transmit transaction data thereto. The communication interface 404 may enable the printer 40 to communicate with the host in real time. Alternatively, the printer 40 may be operated off-line such that the data received from a host is stored in a look-up table or the like in a memory of the printer for later use. Similarly, data may be entered via one or more of the input devices stored in a memory of the printer and later transmitted with a batch of data records to a host via a communication port 404.

A RFID read/write module 410 may be mounted in printer 40. In various aspects of the invention, modules 602 (FIG. 3) and module 410 (FIG. 4) are interchangeable. The RFID read/write module 410 is capable of reading and/or writing to a RFID transponder embedded in a record member that is driven by a motor 165'.

The printer 40 includes a microprocessor 608 and a memory 610. The memory 610 includes non-volatile memory such as flash memory 612 and/or a ROM 614 such as the EEPROM. Any other type of memory (not shown) may be used as well including, for example, PROM or EPROM. The memory 610 also includes a RAM 616 for storing and manipulating data. In accordance with an embodiment of the invention, the microprocessor 608 controls the operations of the printer 40 in accordance with an application program that is stored in memory 610. The microprocessor 608 may operate directly in accordance with the application program. Alternatively, the microprocessor 608 may operate indirectly in accordance with the application program as interpreted by an interpreter program stored in the memory 610.

The printer 40 may also include a display 620 and a printing system 391. A keypad 622 may be included on printer 40. The terms RFID module and RFID reader/writer refer to the structure and/or software to read and/or write data to a RFID chip or transponder.

Whether referred to herein as a RFID reader/writer or a RFID read/write module, the structure and software may be in a miniature device or it may be incorporated into the printer electronics and software.

In an aspect of the invention, a printer such as a RFID printer may be capable of encoding an inlay or multiple inlays within a record member while the web is continuously moving. In an embodiment, an RF field may be adjusted so that only one inlay at a time may be located in the RF field for encoding of the inlay. Additionally, the invention enables an inlay to be placed anywhere within the record member and is not limited to placement at a fixed location within the record member.

In another aspect of the invention, while a record member is being encoded on a moving web, the record member may be printed upon when a leading edge of a record member reaches the print position. In an embodiment, the printing and encoding of a record member may be started and/or completed nearly simultaneously.

In another embodiment of the invention, where smaller record members are to be encoded and printed, a first encoded record member may be printed upon when it reaches a print position as a second succeeding record member is being encoded.

In yet a further embodiment of the invention, multiple transponders per record member may be encoded. Additionally, because the invention utilizes encoding at one position and printing at another position, a record member does not contain no-print zones.

In a further aspect of the invention, a printer such as a RFID printer may decrease a web's speed based on a determination that a requested web speed does not allow for encoding while the web is moving at the requested speed.

In yet another aspect of the invention, a printer such as a RFID printer may increase a web's speed based on a determination that a requested web speed may be increased allowing for faster encoding of transponders.

In another aspect of the invention, a calibration sequence may determine a length and location of an RF field given a current inlay and RF power setting. In an embodiment, the distance between a print head and the index sensor 399 may be known based on the physical distance between the print head and the index sensor 399. Moreover, in an embodiment the index sensor 399 remains outside of the RF field so that the length of the RF field may be less than the distance between the RF antenna and the index sensor 399.

In another aspect of the invention, a RFID printer includes an antenna system that is discriminating enough so that RFID transponders at closely spaced locations along a web of printable record members may be read from and/or written by a read and/or write station on a one-by-one basis without being affected by or affecting a RFID transponder in an adjacent record member.

FIGS. 5-9 describe flow charts which illustrate instructions in the form of computer-readable flow diagrams that may be implemented in various aspects of the invention by printer 40. The instructions in the form of flow diagrams may be program instructions comprising a single program or may be divided into various program modules. The program instructions may be compiled into a processor-executable format and/or a format such that the instructions can be interpreted by an interpreter. In addition, the program modules may be combined or distributed in various computing environments.

Figure 5:
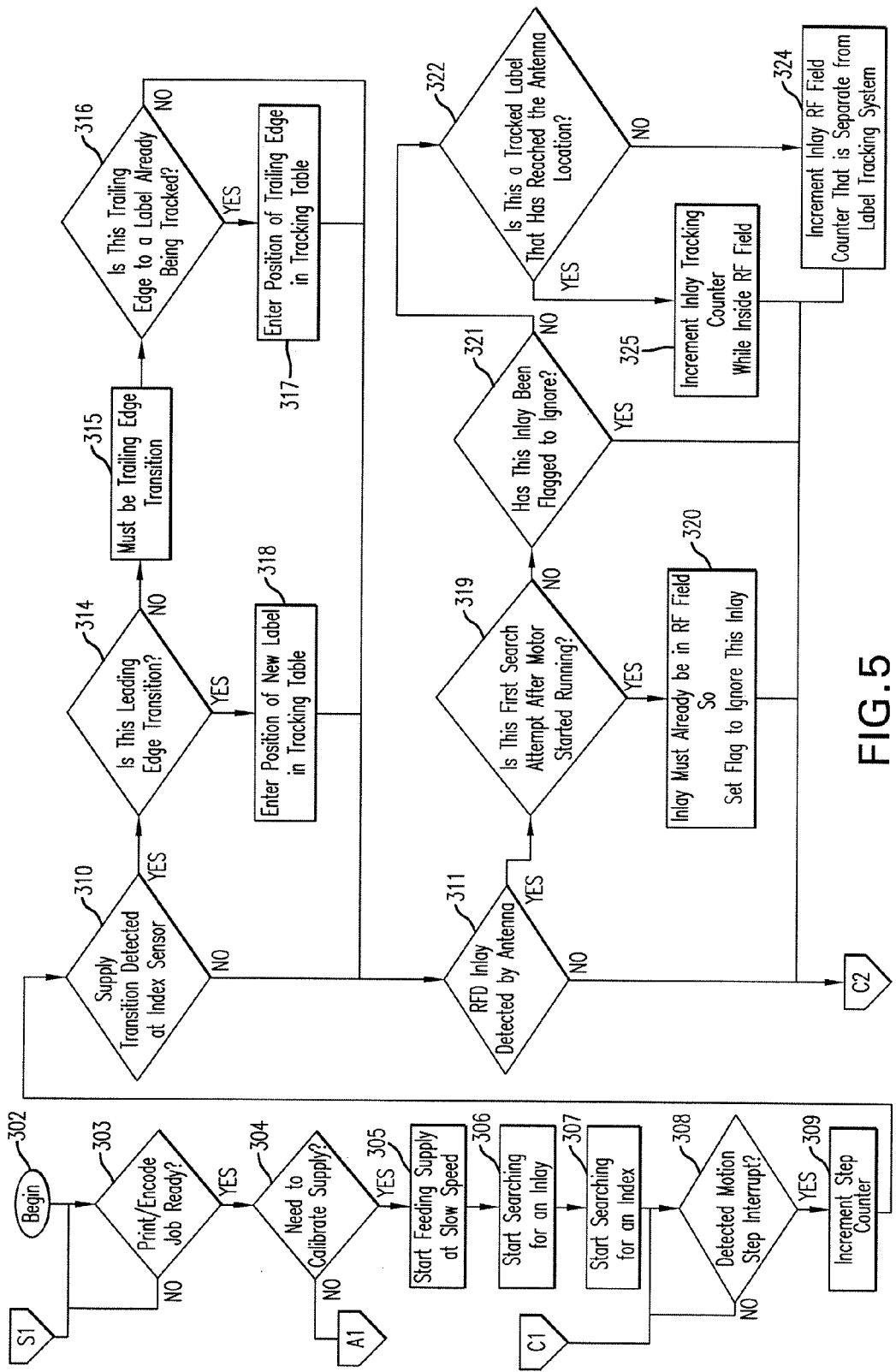
FIGS. 5-6 illustrate flow charts for calibration of a RFID printer in accordance with an aspect of the invention.
Figure 6:
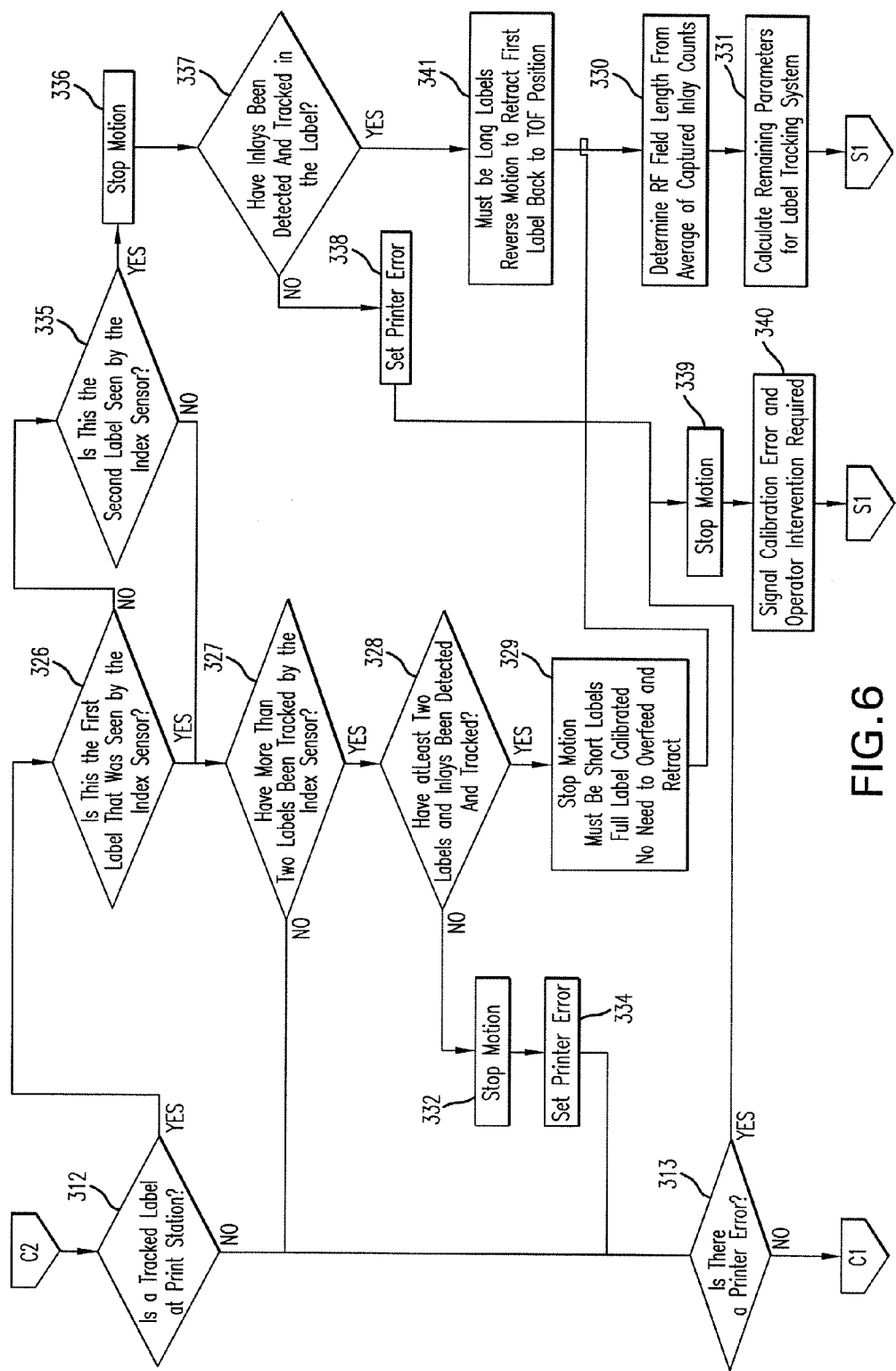

FIGS. 5-6 describe a process of calibration which may be used in various aspects of the invention. In a calibration sequence, various physical aspects of the record member may be determined such as length of the record member and location and length of gaps between each record member. In addition, the detectable positions of the inlay or inlays within the record member may be determined during the calibration process.

In addition, in another aspect of the invention, the record members being used in the RFID printer may be assumed to have a fixed length for each type of web utilized and the inlays included therein on each record member are located in approximately the same fixed mechanical position in each record member.

In an aspect of the invention, during calibration a web may be moving at a slower speed than at an encoding and/or printing speed. In an embodiment, a number of steps may be counted in which an inlay remains in a generated RF field. The calculation of the number of steps may be used to determine the length of the RF field which may be adjusted, if needed.

For example, during a supply change, a new roll of record members may be loaded into a printer. Upon initial startup after loading of the new supply, the position of a record member or record members with respect to an index sensor 399 may be unknown. In an embodiment, the index sensor 399 is preferably positioned upstream of a generated RF field. Once a leading edge of a label or tag reaches the index sensor 399, then a counter may begin counting the number of steps that an inlay remains in the RF field. The steps may represent steps taken by a stepper motor. In an aspect of the invention, the index sensor 399 position may be used as a reference point or origin so that a count may be determined starting at a time when a leading edge of a label is detected by the index sensor 399.

In an embodiment, the RF field length based on a particular power setting may be determined to be approximately 16 millimeters in length.

In another aspect of the invention, the number of steps past an index sensor 399 may be used to determine the detectable position of an inlay within a record member. In an embodiment, each step may represent 5 mils of movement. Those skilled in the art will realize that in different embodiments a step may be greater or less than 5 mils of movement.

In addition, when an inlay leaves the RF field, the end position of the inlay may also be determined based on the location of the record member's leading edge. Upon detection of the end position of the detectable transponder, the overall length of the RF field can be determined.

In yet another aspect of the invention, a record member containing an inlay or inlays may be encoded while the web is in motion whether the record member is shorter than the distance from print head to an index sensor 399 or equal or longer.

In an embodiment, a record member may be tracked and information regarding the record member may be stored in a record member tracking schema or database.

Returning to the calibration process of FIGS. 5 and 6, upon startup, if an inlay is determined to be already in the generated RF field, then that record member may be ignored during the calibration process. In another embodiment, upon startup if no inlay is determined to be in the generated RF field, then the first inlay to be identified as entering the RF field may be tracked to determine the length of the RF field.

In an aspect of the invention, an index sensor 399 may detect a leading edge of a record member. In an embodiment, the number of steps from the detected leading edge of a record member to where an inlay first enters the generated RF field may be determined. Moreover, the number of steps the inlay remains in the RF field may also be determined.

In FIG. 5, a calibration process for a printer begins at step 302. In an aspect of the invention, the steps illustrated in FIGS. 5-6 may be accomplished in a single motion step. At step 303, it may determined if a print/encode job is ready. If no print/encode job is ready, then the process recycles until such a job has been received. If a print/encode job has been received, then a determination is made in step 304 as to whether a supply of labels and/or tags needs to be calibrated.

Figure 7:
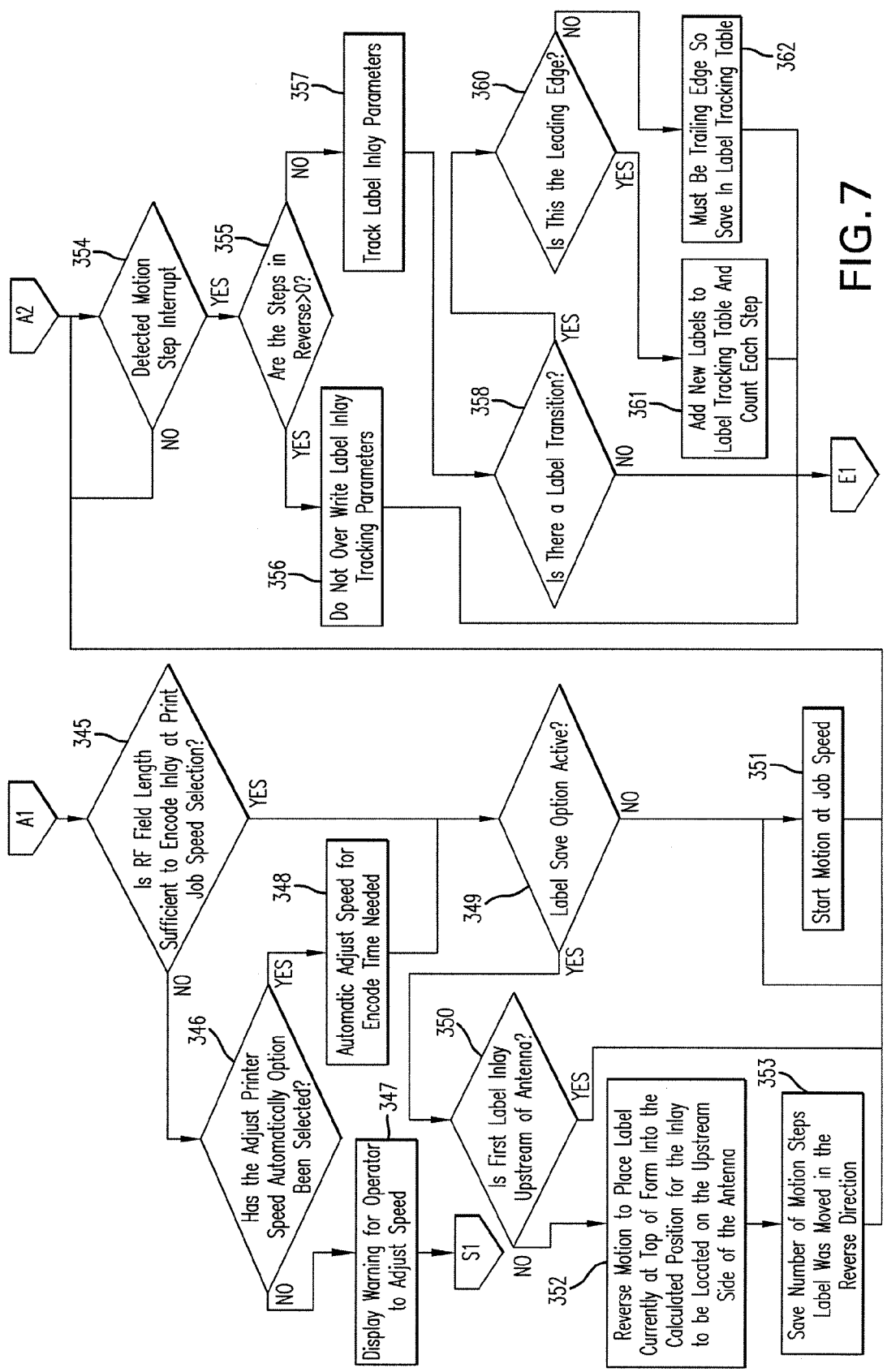
FIGS. 7-9 illustrate flow charts for executing printing functionality for a RFID printer in accordance with an aspect of the invention.
Figure 8:
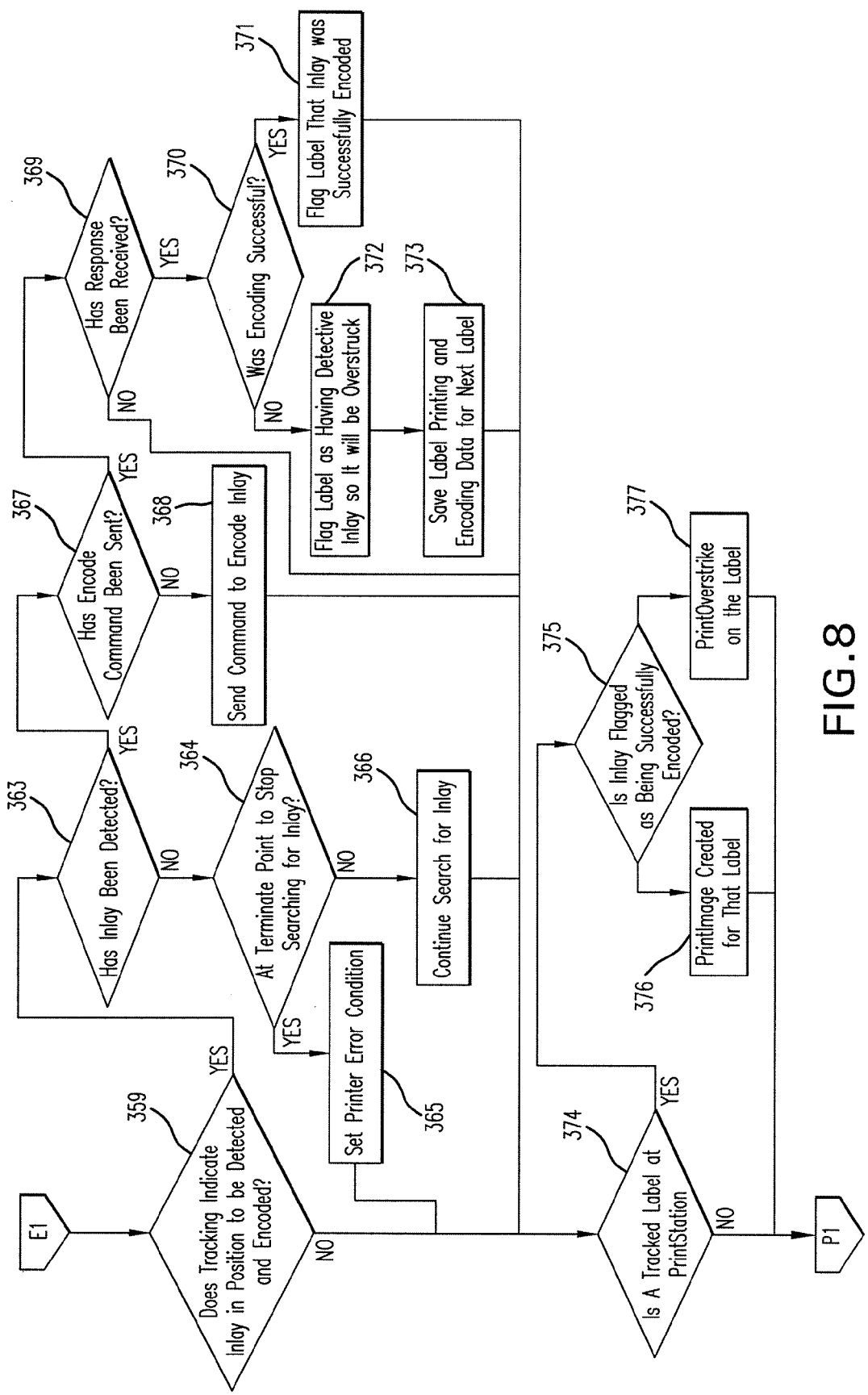
Figure 9:
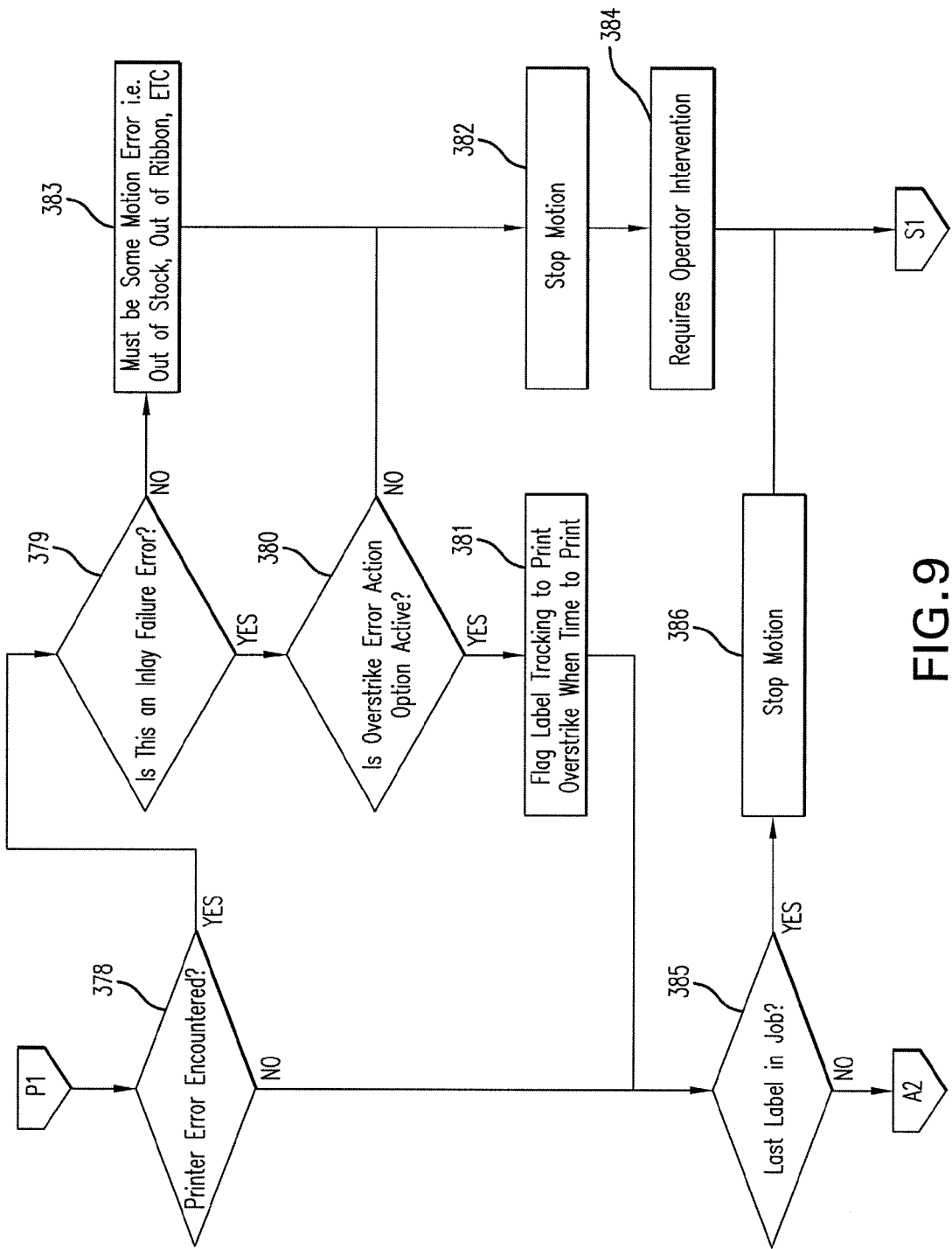

In an embodiment, if the supply does not need to be calibrated, then the calibration process is completed and the flow moves to the printing/encoding process of FIGS. 7-9 as shown in path A1. In an alternative embodiment, if a supply does need to be calibrated in step 304, then at step 305 the supply begins to be fed at slow speed into the printer. Those skilled in the art will realize that slow speed means a speed slower than normal printing speed. Furthermore, speed may be selectable as numerous printers have adjustable speeds which may be incremented. For example, speed may be incremented in steps which represent a half inch per second increments. In an embodiment, the speed may be adjusted with use of speed regulator or equivalent apparatus.

Next, in step 306 the printer may begin to start searching for an inlay. Similarly, in step 307, the printer may begin to search for an index.

In step 308, a determination may be made as to whether a motion step interrupt has been detected. If a motion step interrupt has not been detected, then the process recycles until one is detected. If a motion step interrupt has been detected, then in step 309 a step counter may be incremented.

The calibration process continues to step 310 where a determination may be made as to whether a supply transition has been detected at an index sensor 399. If a supply transition has not been detected at an index sensor, then the printer may continue to step 311 where a determination may be made as to whether a RFID inlay is detected.

If in step 311, a RFID inlay is not sensed by the printer's antenna, then the printer continues to step 312 (Path C2; FIG. 6) where a determination may be made as to whether a tracked record member is positioned at the print station.

If a tracked record member is not positioned at the print station, then in step 312 the printer may continue to step 313 to determine if a printer error has occurred. In step 313, if no printer error has occurred, then the printer may recycle back to step 308 (through path C1) until another motion step interrupt is detected.

Returning to step 310, if a supply transition is detected at the index sensor 399, then the printer continues to step 314 to determine if a leading edge of a transition has been detected. If the determination is made that the transition is not a leading edge transition in step 314, then the transition is a trailing edge transition as shown at step 315.

Next, in step 316 a determination is made as to whether the detected trailing edge of a record member is already being tracked. If the trailing edge of the record member is already being tracked, then the printer in step 317 records the position of the trailing edge in a tracking table and the process continues to step 311. If in step 316 a determination is made that the trailing edge of a record member is not being tracked, then the printer continues to step 311.

Returning to step 314, if a determination is made that the detected transition is a leading edge transition, then in step 318 the position of the new record member is entered into a tracking table and the process continues at step 311.

If in step 311, a determination is made that a RFID inlay is detected by the antenna, then in step 319 a determination may be made as to whether this is a first search attempt after motor startup. If this is the first search attempt after motor start-up, then in step 320 a flag may be set to ignore this inlay as the inlay is already in the RF field. As the inlay is already in the RF field, the actual length of the RF field may not be determinable. Next, the process continues to step 312 (through path C2).

If in step 319, a determination is made that this is not the first search attempt after motor startup then in step 321, a determination may be made as to whether the inlay has been flagged to ignore. If the inlay has been flagged to ignore, then the printer continues to step 312 (through path C2). If the inlay has not been flagged to ignore, then in step 322 a determination is made as to whether the tracked record member has reached the antenna location. If the tracked record member has not reached the antenna location, then in step 324 a RF field counter may be incremented and the process continues to step 312. The RF field counter may be a separate counter that is not part of the record member tracking system. If the tracked record member has reached the antenna as determined in step 322, then an inlay tracking counter in step 325 is incremented while the tracked record member remains in the RF field and the process continue to step 312.

Continuing the calibration process in FIG. 6, a determination may be made in step 312 concerning whether a tracked record member is located at the print station. If a tracked record member is located at the print station, then at 326 a determination may be made as to whether the tracked record member is a first record member that has been seen by the index sensor 399. If the tracked record member located at the print station is a first record member seen by the index sensor 399, then a determination may be made in step 327 as to whether two or more record members have been tracked by the index sensor 399. The positive determination in step 327 may indicate that relatively shorter record members are being processed by the printer. Furthermore, in an embodiment, even if the label-save is activated, the printer may not have to overfeed as the data needed may have already been collected.

If it is determined that two or more record members have been tracked by the index sensor 399 at step 327, then in step 328 a determination may be made as to whether at least two record members and inlays have been detected and tracked. If in step 328 at least two record members and inlays have been detected and tracked, then motion may be stopped in step 329 as at least one full record member has been calibrated and the printer does not want to overfeed and waste record members. The printer continues to step 330 where an RF field length may be determined from an average of captured inlay counts. Next, in step 331 the remaining parameters for the record member tracking system may be calculated and the process recycles back to step 303 (through path S1) to process a ready print/encode job.

Returning to step 327, if the determination is negative as to whether two or more record members have been tracked by the index sensor 399, then the process continues to step 313.

Returning to step 328, if at least two record members and their transponders have not been detected and tracked, then the printer motion is stopped in step 332. A printer error may be generated in step 334 and the process continues to step 313. If a printer error is not determined to be present in step 313, then the process continues at step 308 (FIG. 5) through path C1. However, if a printer error has been determined in step 313, then in step 339 motion of the web may be stopped. A calibration error signal may be generated to indicate that operator intervention is necessary as shown in step 340. Next, the process may continue to step 303 (FIG. 5) through path S1.

In another aspect of the invention back at step 326, if the tracked record member located at the print station is not the first record member seen by the index sensor 399, then in step 335 a determination may be made as to whether the tracked record member is the second record member seen by the index sensor 399. If the tracked record member is not the second record member seen by the index sensor 399, then the process continues to step 327. However, if the tracked record member is the second record member seen by the index sensor 399 in step 335, then in step 336 the web motion may be stopped. The stopping of the web in step 336 may indicate that relatively longer record members are being printed/encoded and the first record member may have already passed the nip of the printer. Next, in step 337 a determination may be made as to whether inlays have been detected and tracked in the record members. If no inlays have been detected and tracked in step 337, then in step 338 a printer error may be set and motion of the web stopped in step 339. A calibration error signal may be generated to indicate that operator intervention is necessary as shown in step 340. Next, the process may continue to step 303 (FIG. 5) through path S1.

Returning to step 337, if a determination is made that inlays have been detected and tracked, then the printer proceeds to step 341. In step 341, the motion of the web may be reversed to retract the first record member back to top of form position. This may indicate that the label-save feature was activated so that record members are not wasted. Next, in step 330 a RF field length may be determined from an average of captured inlay counts. Finally, in step 331 the remaining parameters for the record member tracking system may be calculated and the process recycles back to step 303 (through path S1) to process a ready print/encode job.

In an aspect of the invention, the printing process may begin with FIG. 5 at step 302 and continue to step 303. At step 303, it may be determined if a print/encode job is ready. If no print/encode job is ready, then the process recycles until such a job has been received. If a print/encode job has been received, then a determination is made in step 304 as to whether a supply of record members needs to be calibrated.

In an embodiment, if the supply does not need to be calibrated, then the calibration process is completed and the flow continues to the printing/encoding process of FIGS. 7-9 as shown in path A1. In step 345 (FIG. 7), a determination is made as to whether a RF field is sufficient to encode an inlay at the currently selected print job speed. If the RF field is sufficient to encode the inlay, then the process continues to step 349.

Those skilled in the art will realize that the earlier discussed calibration process may have occurred at a slower speed than the operating or selected printing speed desired by the end user. In an embodiment, an encoding process may take approximately 100 ms to encode an inlay. In such an embodiment, an inlay would have to remain within an RF field for at least 100 ms to be properly encoded. Therefore, in this exemplary embodiment the printer speed and RF field (determined in part by at least RF power and antenna design) must be such that the inlay remains within the RF field for at least the 100 ms. If in step 345, the determination is made that the RF field is insufficient to encode an inlay, then at step 346 the printer speed may be automatically adjusted. In an embodiment the automatic adjustment of speed feature may or may not be enabled by a customer upon setup of a particular printer.

If in step 346, the automatic adjustment of speed has not been selected, then in step 347 a display may warn an operator that a manual speed adjustment may be necessary and the process continues to step 303 (FIG. 5) through path S1. If however, in step 346 the automatic speed adjustment option has been selected, then in step 348 the speed is automatically adjusted for the encoding time necessary to encode the inlay. Next, in step 349 a determination may be made as to whether the label-save option has been activated. In an embodiment, the label-save feature may retract a record member so that a record member is not unnecessarily wasted. The retracted record member may be returned to its top of form position so that encoding may occur on that record member. If the label-save option has not been selected, then in step 351 the web may begin to move in the forward direction at job speed.

If the label-save option has been selected in step 349, then in step 350 a determination may be made as to whether a first record member inlay is upstream of the antenna. As those skilled in the art will realize, the physical distance of the print head to the antenna may be known based on the physical characteristics of the particular printer. Additionally, if the inlay is far enough into the record member, then the inlay may be upstream of the antenna or the leading edge of the RF field.

If the first record member is upstream of the antenna in step 350, then we start forward web motion in step 351. However, if the first record member is not upstream of the antenna, then at step 352 the web is reversed so that the record member currently at top of form (or at the nip) is positioned into the calculated position so that the inlay is located on the upstream side of the antenna. Next, in step 353 the number of motion steps used in the reverse direction may be stored and the process continues at step 351 with the web moving in the forward direction at job speed.

Next, in step 354 a determination is made as to whether a motion step interrupt has been detected. In step 354, the printer may recycle until a motion step interrupt is detected. If a motion step interrupt is detected in step 354, then the process may continue in step 355 to determine if the steps in reverse are greater than zero. If the steps in reverse are greater than zero, then in step 356 the record member and inlay parameters are not overwritten because it may be determined that the record member has already been counted. The process may continue to step 359 (FIG. 8) through path E1.

If in step 355, the steps counted are not greater then zero, than in step 357 the record member along with the inlay parameters may be tracked. Next, in step 358 a determination may be made as to whether there is a record member transition. If there is not a record member transition detected, then the process continues to step 359 (FIG. 8) through path E1. If a record member transition has been detected in step 358, then in step 360 a determination as to whether the detected transition may be a leading edge may be determined. If the transition is a leading edge as determined in step 360, then a new record member has been determined and the new record member information is stored in the tracking table and each step is counted as indicated in step 361. The process then may continue to step 359 (FIG. 8) through path E1. If the transition is determined not to be a leading edge as determined in step 360, then in step 362 the transition may be a trailing edge and that information is stored in the record member tracking table. The process may then continue to step 359 (FIG. 8) through path E1.

In step 359 (FIG. 8), a determination may be made as to whether the tracking indicates that an inlay is in position to be detected and encoded. If an inlay is in position to be detected and ready to encode, then the process continues to step 363. In step 363, a determination may be made regarding whether an inlay has been detected. If in step 363 an inlay has not been detected, then in step 364 a determination may be made as to whether the printer may stop searching for an inlay. For example, a determination may be made to terminate the search for an inlay because the inlay can not fit in the remaining portion of the record member due to some constraint such as physical size of the inlay. If it is determined in step 364 that a termination point has been reached, then a printer error condition may be set in step 365 and process may continue at step 374. If the criteria for step 364 have not been met, then the process may continue to search for an inlay in step 366 with the process continuing to step 374.

Returning to step 363, if an inlay has been detected in step 363, then in step 367 a determination may be made as to whether an encode command has been sent. If an encode command code has not been sent, then in step 368 a command to encode the inlay may be sent. The process may then continue with step 374.

If in step 367 an encode command has been sent, then a determination may be made in step 369 as to whether a response has been received. If a response in step 369 has not been received, then the process may continue to step 374 to determine if a tracked record member is positioned at the print station. If a response has been received in step 369, then the process may continue to step 370 to determine if the encoding was successful. If in step 370 the encoding was successful, then the process flags that the record member having the inlay was successfully encoded in step 371 and the process continues to step 374. If in step 370 it is determined that the encoding was not successful, then in step 372 the record member may be flagged as including a defective inlay and may be overstruck to prevent use of the record member. Next, in step 373 record member printing and encoding data for the next record member may be saved and the process continues to step 374.

Returning to step 359 if a determination has been made that tracking indicates that an inlay is not in position to be detected and encoded, then the process may continue to step 374. In an aspect of the invention, at step 374, a determination may be made as to whether a tracked record member is positioned at the print station. If the tracked record member is not positioned at the print station in step 374, then the process may continue at step 378 (FIG. 9) through path P1.

If the tracked record member is located at the print station as determined at step 374, then a determination may be made at step 375 as to whether an inlay has been flagged as being successfully encoded. If the inlay has been successfully encoded, then the image may be printed for that record member in step 376 and the process continues at step 378 (FIG. 9) through path P1.

If the inlay has not been flagged as being successfully encoded, then in step 377 an overstrike pattern may be printed on the record member. Next, the process may continue at step 378 (FIG. 9) through path P1.

At step 378 a determination may be made as to whether the printer has encountered an error. If no error has been encountered, the process moves to step 385. If the printer has encountered an error at step 378, then at step 379 a determination may be made as to whether the error is an inlay failure error. If the error is an inlay failure error, then in step 380 a determination may be made as to whether an overstrike error action option is active. If the overstrike error action is active, then a flag may be set that an overstrike pattern is to be printed on the record member when the record member is positioned at the print head for printing as step 381 and the process continues at step 385.

If the overstrike error action in step 380 is not active, then in step 382 web motion may be stopped and an indication is transmitted that the printer may require operator intervention at step 384. The process may return back to FIG. 5 through path S1 to wait for the next print/encode job.

Returning to step 379, if it is determined that the printer error is not an inlay failure, then the printer error may be a motion error such as out of stock or out of ribbon type error as indicated in step 383. Next, the printer web motion is stopped at step 382 and an indication may be transmitted that the printer may require operator intervention at step 384. The process may return back to FIG. 5 through path S1 to wait for the next print/encode job.

Finally, in step 385 a determination may be made as to whether the current record member is the last record member in the print/encode job. If the current record member is determined to be the last record member in the print/encode job, then motion is stopped in step 386 and the process may return back to FIG. 5 through path S1 to wait for the next print/encode job. If the current record member is not the last record member in the print/encode job, then the process may return back to FIG. 7 through path A2.

Figure 24:
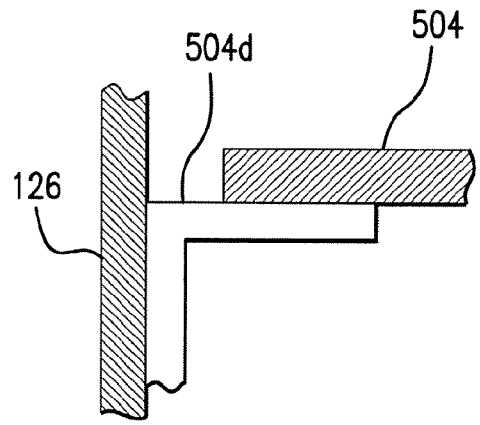
FIG. 24 is a sectional view similar to FIG. 23 in accordance with an aspect of the invention.

FIGS. 22-31 illustrate an antenna for use in accordance with various aspects of this invention. Any downstream radiation may be detrimental to transponders located downstream of shielding. Because radiation can be deflected or reflected from components of and within the printer, some radiation can be experienced by transponders downstream of shielding in spite of the presence of shielding. With reference to the embodiment of FIGS. 22 and 23, there is shown a connector generally indicated at 504a which connects the electrically conductive grounded portion 504 of the electrically conductive shield 501 and the electrically conductive grounded wall 126 which is spaced from the shield 501. The wall 126 may also be a shield. The connector 504a is shown to include a conductive strap 504b (FIG. 23) which can be comprised of a suitable material which is electrically conductive such as copper. The strap is secured to the portion 504 and the wall 126 as for example by adhesive 504c. In that the adhesive 504c may be electrically non-conductive, the connector 504a capacitively connects or couples the portion 504 and the wall 126 to each other. Alternatively, the adhesive 504c can be electrically conductive, in which event the portion 504 and the wall 126 are electrically connected, namely grounded. In the embodiment of FIG. 24, a connector 504d can be electrically connected, that is grounded, to the wall 126. The conductor 504a may be attached by screws not shown or by welding or soldering, if desired. The connector may be an electrically conductive spring clip attached to the portion 504 that touches the wall 126, or vice versa. If desired, more than one of such capacitive or mainly electrically conductive connector or bridge between spaced conductive and grounded structures can be used.

The shield 501 (FIG. 22) and the wall 126 are electrically grounded to the printer frame member 72 (FIG. 1). It has been found that even though the portion 504 (FIG. 22) and the wall 126 are separately electrically grounded, because the portion 504 and the wall 126 are spaced, the connection of the portion 504 and the wall 126 either capacitively or solely electrically diminishes the amount of radiation which passes to locations downstream of the shield 501. Accordingly, where portions of shield 501 are spaced apart, the effectiveness of the shield 501 can be enhanced by either capacitively coupling or grounding the spaced apart parts of the shielding. One example is the coupling or connection of the portion of the shield 504 and the wall or shield 126.

Figure 25:
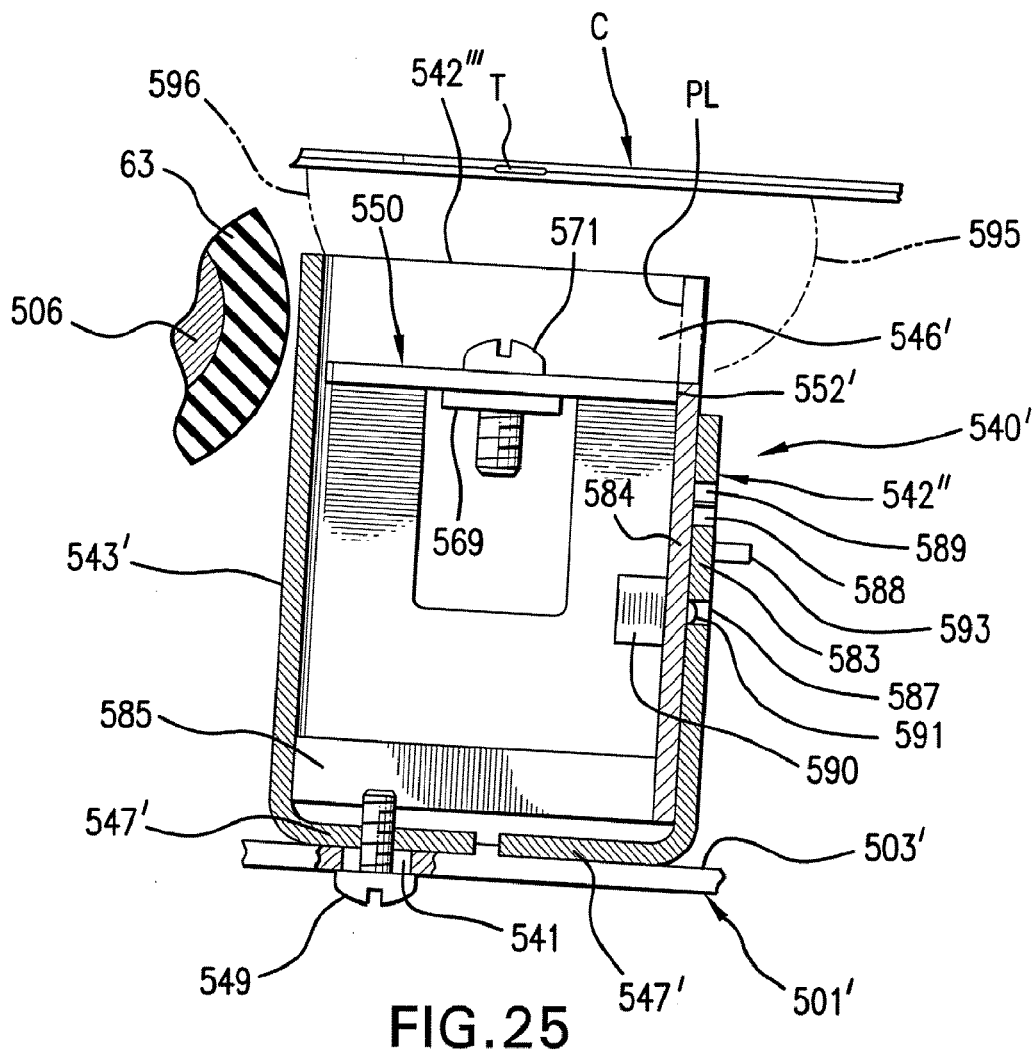
FIG. 25 is an enlarged sectional view in accordance with an aspect of the invention.
Figure 26:
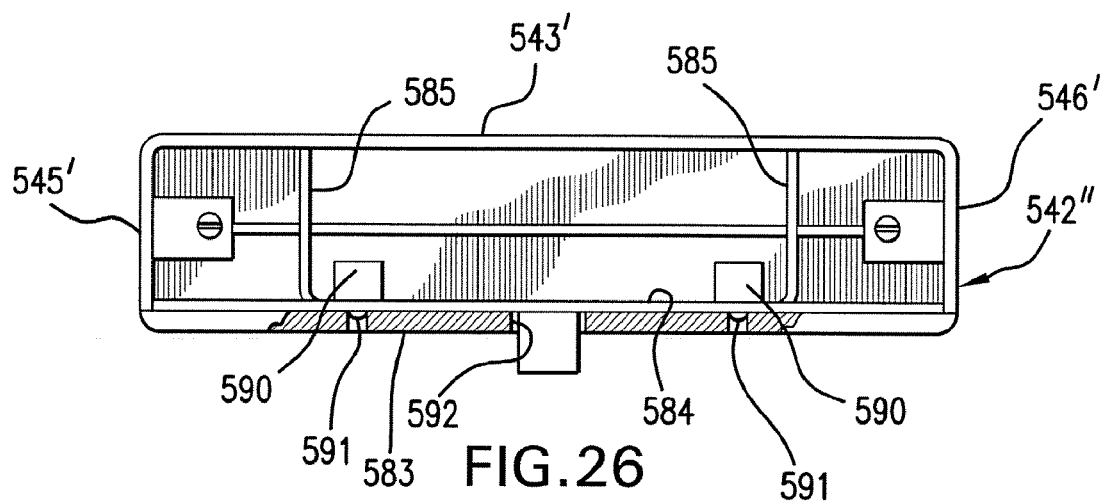
FIG. 26 is a top plan view of the antenna assembly shown in FIG. 25 in accordance with an aspect of the invention.
Figure 27:
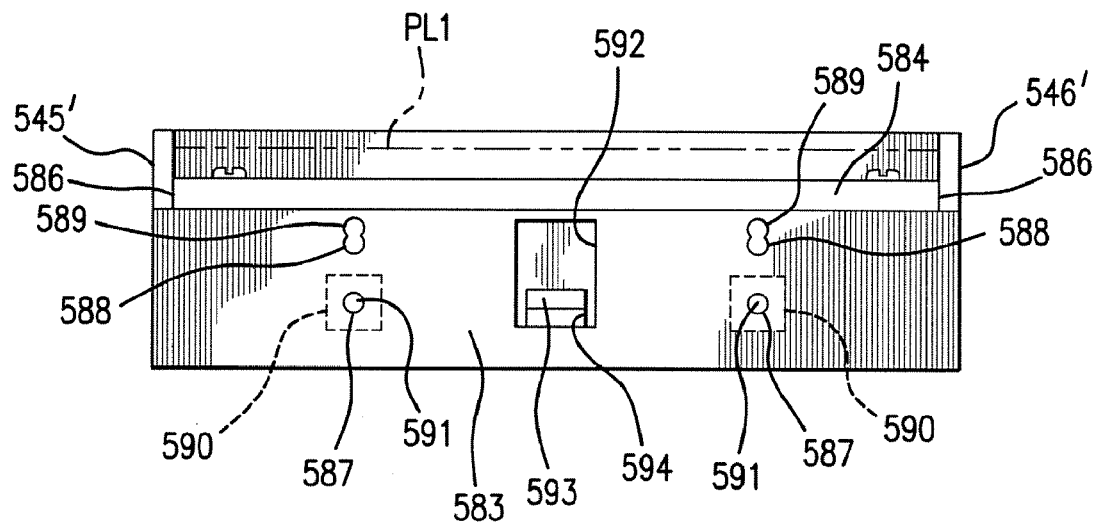
FIG. 27 is an elevational view of the antenna assembly as shown in FIGS. 1, 25 and 26 as viewed from the right side of FIG. 25 in accordance with an aspect of the invention.
Figure 28:
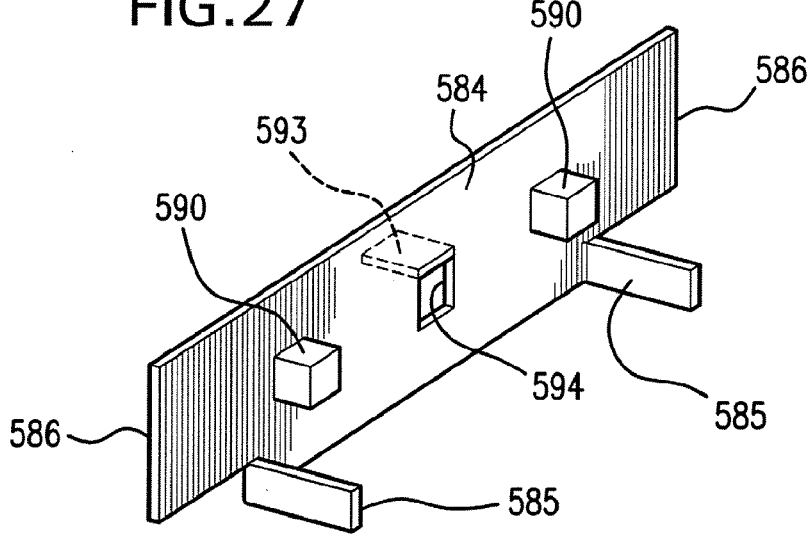
FIG. 28 is a perspective view of a movable wall of a shield also shown in FIGS. 25 through 27 in accordance with an aspect of the invention.
Figure 29:
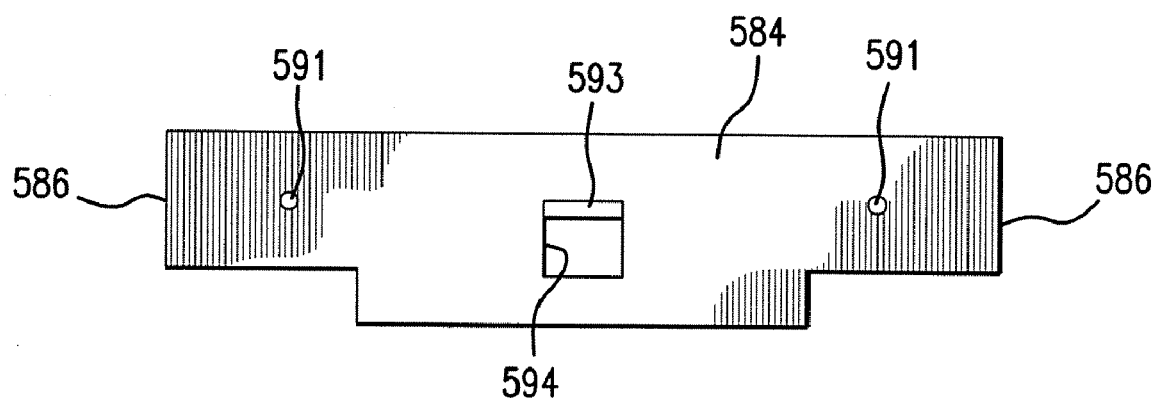
FIG. 29 is an elevational view of the movable wall also shown in FIGS. 25 through 28 in accordance with an aspect of the invention.

With reference to the embodiment of FIGS. 25 through 29, there is shown an antenna assembly 540' having an opening 542'" which is identical to the antenna assembly 540 except that shield 542" is configurable to aim or focus or direct more energy radiated by the antenna 550 selectively upstream than in the case of the shield 542. Components of the antenna assembly 540' having the same construction and function as the antenna assembly 540 bear the same reference characters. Referring to FIGS. 25 through 27, walls 543'; 545'; 546' and 547' are essentially the same as the walls 543, 545, 546 and 547. Instead of the wall 544, the shield 542" may have a mounting member or wall 583. The mounting member 583 may extend essentially to the antenna 550 as shown in FIG. 25. The mounting member 583 may form part of the shield 542" and may itself be considered to be a wall. A movable shield or shield member 584 illustrated in FIGS. 28 and 29 is movably mounted against the wall 583, and can move, and in particular slide, between the position shown in solid lines in FIGS. 25 and 27 and the position shown in phantom lines PL in FIG. 25. The wall or shield 584 has a pair of spaced bent-out tabs or extensions 585 which can contact the wall 543' as shown in FIGS. 25 and 26 to enable the wall 584 to be guided between the solid line and phantom line positions. The tabs 585 and the edge 552' of the antenna 550 hold the wall 584 in contact with the wall 583. Opposite ends 586 of the shield 584 can contact and are confined by walls 545' and 546'. The member 583 can have spaced pairs of holes or depressions 587, 588 and 589. The holes 587, 588 and 589 of each pair can be vertically aligned, as shown. The holes 588 and 589 are shown close to each other so they actually overlap. A pair of detents 590 is secured to the wall 584. Each detent 590 can include a spring-urged ball 591 cooperable with one of the holes 587, 588 and 589 at a time. The detents 590 hold the wall 584 selectively in the solid line position shown in FIGS. 25 and 27, or in a position shown by phantom line PL1 in FIG. 27 or in the position shown by phantom lines PL in FIG. 25.

The member 583 can have any desired number of detent positions. Accordingly, the member 583 can have holes at any desired spacing. The dimension of the wall 584 can be selected so that it bottoms out against the wall 547' in the solid line position of FIGS. 25 and 27 so that the holes 587 can be eliminated. When the balls 591 of the detents 590 are in holes 589, the wall 584 is at the same height as the wall 554. The member or shield 583 also has an elongate slot 592 (FIGS. 26 and 27) through which a bent-out tab or handle 593 projects. The bending out of the handle 593 leaves an opening 594 in the wall 544. The handle 593 can be used to move the wall 584 between its various positions.

As shown in FIG. 25, when the shield 584 is in the position shown by solid lines, the energy from the antenna 550 can spill over, or be directed or aimed more in the upstream direction than in the embodiment of FIGS. 10 through 21 as illustrated by dash-dash line 595. Even with the wall 543', which is like the wall 543, there is a certain amount of downstream spill-over of the radiation from the antenna 550 as shown by dash-dash line 596. The lines 595 and 596 are not to be taken as precise representations of the radiation limits, but merely illustrative. The spill-over varies as the amount of energy transmitted by the antenna 550 or radiated by the transponder T, the closeness of the antenna 550 to the composite web C, the height of the walls 543 (or 543') or 544 (or 584), and so on. By allowing more energy to be directed or focused in the upstream direction, the transponder T comes into the field of RF radiation sooner and hence can be encoded sooner. This enables the transponder T to be encoded in a broader field, while allowing the web C to travel at a greater speed, hence increasing the throughput. On the other hand, the field of radiation downstream of the antenna preferably is limited by the wall 543' the same as wall 543 limited the field of radiation to prevent re-writing of the encoded transponder T.

Figure 30:
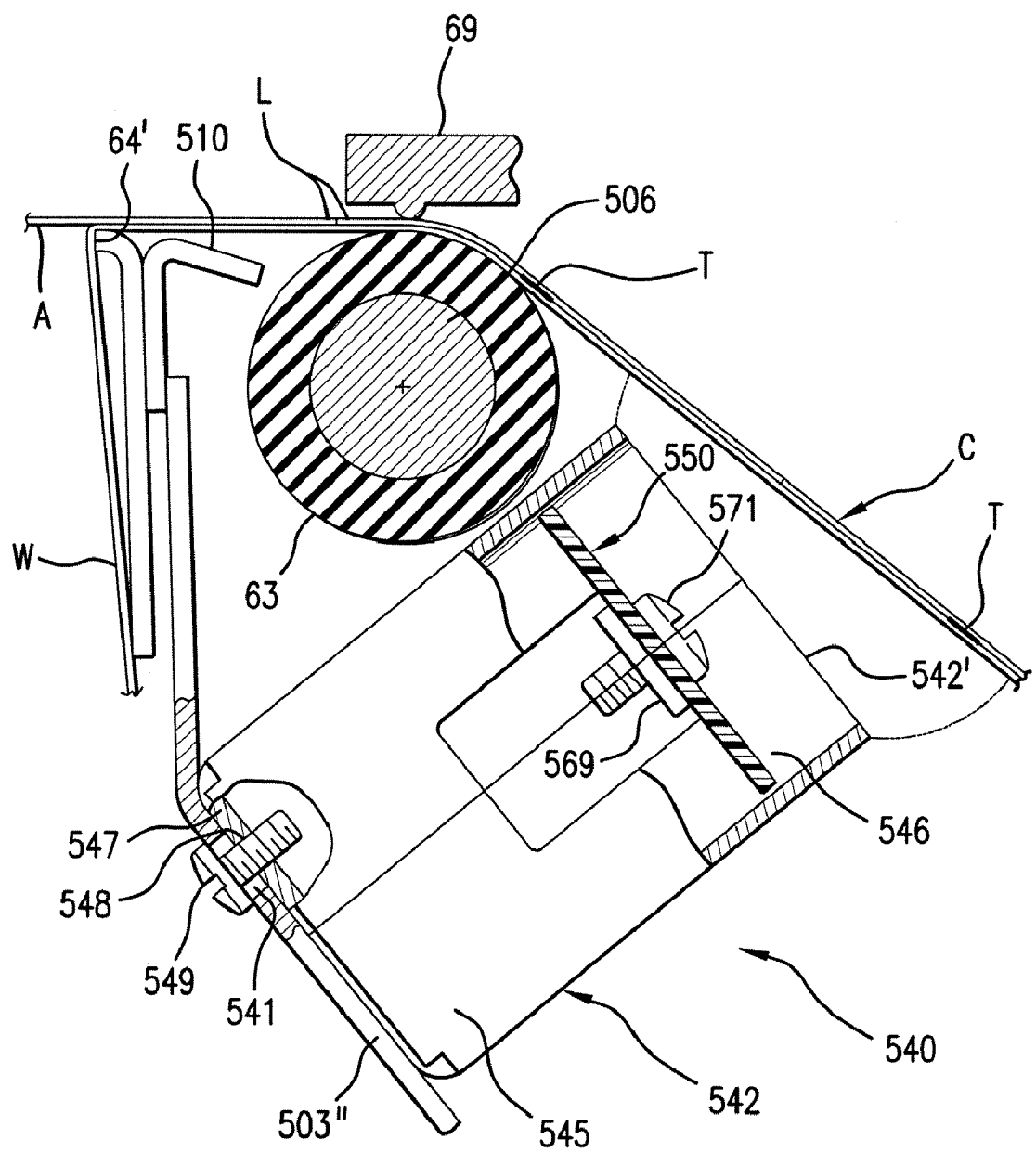
FIG. 30 is a sectional view similar to FIG. 10 but showing the antenna assembly aimed or focused upstream of the path of the RFID transponder-containing web so that the field of radiation of the antenna is greater in the upstream direction than in the downstream direction in accordance with an aspect of the invention.

With reference to the embodiment of FIG. 30, the arrangement is the same as the arrangement shown in the embodiment of FIGS. 10 through 21 except that the antenna assembly designated 540 is tilted so that the field of radiation is aimed in the upstream direction more than in the downstream direction. The aiming or focusing or directing of the RF energy in the embodiment of FIG. 30 can be achieved by inclining the portion 503" to a greater extent than the inclined portion 503' or by shimming the enclosure 540 or by selectively controlling the inclination of the antenna assembly 540 by a cam (not shown).

Figure 31:
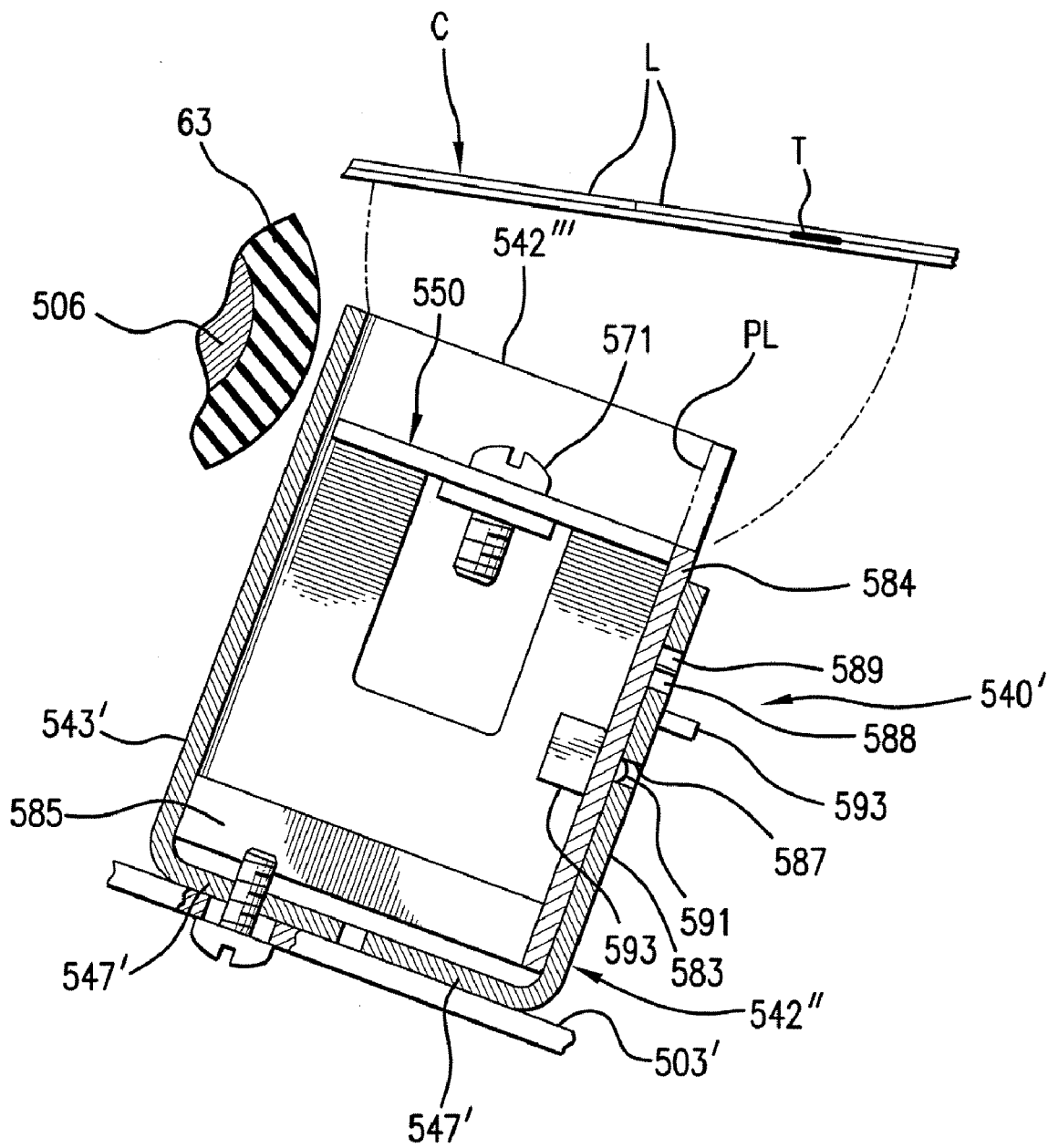
FIG. 31 is a sectional view similar to FIG. 25 but showing the antenna assembly aimed or focused upstream of the path of the RFID transponder-containing web so that the field of radiation is greater in the upstream direction than in the downstream direction in accordance with an aspect of the invention.

With reference to the embodiment of FIG. 31, the arrangement is the same as the arrangement shown in the embodiment of FIGS. 25 through 29, except that the antenna assembly 540' is tilted or inclined to a greater degree so that the field of radiation energy is even more extensive in the upstream direction than in the downstream direction. This can be achieved by inclining the portion 503' to a greater extent or by shimming the enclosure or by selectively controlling the inclination of the antenna assembly 540 by a cam (not shown).

In general, the shielding or shields disclosed in the embodiments of FIGS. 25 through 31 of the present application is or are selectively configurable or variable to vary the RF energy field of the antenna 550.

The components of the electrically grounded enclosures 542 and 542' including walls 543, 544, 545, 546, 547, 543', 545', 546', 547', 583 and 554 can be constructed of electrically conductive material such as aluminum.

While the antenna assembly 540' is described in connection with a stationary or tabletop printer 40, the antenna assembly 540' is usable in portable and/or hand-held devices as well. The antenna assembly 540' can be positioned at the front end of a battery-powered, trigger-activated housing with a manually graspable handle as depicted in U.S. Pat. No. 7,180,627.

The invention has been described in terms of exemplary embodiments. Numerous other embodiments, modifications and variations within the scope and spirit of the appended claims will occur to persons of ordinary skill in the art from a review of this disclosure.

We claim:

1. A RFID printer, comprising:
   a RFID reader/writer;
   an index sensor configured to detect a leading edge of a RFID record member, the RFID record member including one or more RFID transponders;
   an antenna configured to emit a RF field and coupled to and cooperating with the RFID reader/writer to read and/or write to a RFID transponder;
   a printing system having a print head and a drive mechanism to drive a web of RFID record members past the print head for printing data thereon;
   a memory; and
   a processor, the processor coupled to the memory, the index sensor, the printing system, and to the RFID reader/writer and operable to encode and print on the RFID record member as the web continues in motion, the processor configured to perform the steps of:
      determining if the RF field is capable of encoding the RFID transponder at a selected continuous web speed, detecting the RFID transponder in a generated RF field, counting a number of steps the RFID transponder remains in the generated RF field, and determining a RF field length based on the counted number of steps wherein each step represents a physical distance;
      if the selected continuous web speed is too high to encode the RFID transponder, determining a continuous lower web speed at which to encode the RFID transponder; and
   adjusting the web speed to the determined continuous web speed to encode the RFID transponder.

2. The RFID printer as recited in claim 1, wherein the processor is further configured to selectively vary the RF field emitted by the antenna.

3. A method of encoding RFID transponders on a continuous moving web, the method comprising the steps of:
  determining if a RF field is capable of encoding the RFID transponders at a selected continuous web speed during a calibration sequence wherein the calibration sequence comprises the steps of initiating web motion, detecting the RFID transponder in a generated RF field, counting a number of steps the RFID transponder remains in the generated RF field, and determining a RF field length based on the counted number of steps wherein a step represents a physical distance;
    if the selected continuous web speed is too high to encode the RFID transponders, determining
      a continuous lower web speed at which to encode the RFID transponders;
      adjusting the web speed to the determined continuous web speed to encode the RFID transponders; and
      printing and encoding the web having the RFID transponder nearly simultaneously.

4. The method of claim 3, wherein the counting of the number of steps is started after detection of a leading edge of a record member.

5. The method of claim 4, wherein the leading edge is detected by an index sensor, the index sensor being located external to the generated RF field.

6. The method of claim 3, wherein the step may represent at least 5 mils of movement.

7. A non-transitory computer-readable medium containing computer-executable instructions for encoding a RFID transponder on a continuous moving web, the steps comprising:
  determining if a RF field is capable of encoding the RFID transponder at a selected continuous web speed during a calibration sequence wherein the calibration sequence comprises the steps of initiating web motion, detecting the RFID transponder in a generated RF field, counting a number of steps the RFID transponder remains in the generated RF field and determining a RF field length based on the counted number of steps wherein a step represents a physical distance;
  if the selected continuous web speed is too high to encode the RFID transponder, determining a continuous lower web speed at which to encode the RFID transponder; and
    adjusting the web speed to the determined continuous web speed to encode the RFID transponder nearly simultaneously.

8. The computer-readable medium of claim 7, wherein the counting of the number of steps is started after detection of a leading edge.

9. The computer-readable medium of claim 8, wherein the leading edge is detected by an index sensor, the index sensor located external to the generated RF field.

10. The computer-readable medium of claim 7, wherein the step may represent at least 5 mils of movement.

11. The computer-readable medium of claim 7, wherein the RF field length is stored to determine an average RF field length.

12. The method of claim 3, further comprising adjusting the web speed to the determined continuous web speed to encode the RFID record member.

13. A printer, comprising:
  a print head capable of printing on a longitudinally extending web of record members having RFID transponders disposed at spaced locations along the web;
  a RFID reader/writer having an antenna disposed upstream of the print head, the antenna being capable of radiating an RF field to the transponders;
  a motor-driven roller capable of advancing the web downstream continuously past the antenna to the print head and beyond;
  a speed regulator responsive to the processor and capable of controlling the speed of advance of the web based on a length of the field and locations of adjacent RFID transponders. and
  a processor, the processor coupled to the memory, the index sensor, the printing system, and to the RFID reader/writer and operable to encode and print on the RFID record member as the web continues in motion, the processor configured to perform the steps of:
    determining if the RF field is capable of encoding the RFID transponder at a selected continuous web speed during a calibration sequence wherein the calibration sequence comprises the steps of initiating web motion, detecting the RFID transponder in a generated RF field, counting a number of steps the transponder remains in the generated RF field, and determining a RF field length based on the counted number of steps wherein a step represents a physical distance;
    if the selected continuous web speed is too high to encode the RFID transponder, determining a continuous lower web speed at which to encode the RFID transponder; and
    adjusting the web speed to the determined continuous web speed to encode the RFID transponder.

14. The printer of claim 13, including a configurable shield to determine at least in part the length of the RF field.

15. The printer of claim 13, including a shield to limit the RF field downstream of the antenna and to focus the RF field upstream of the antenna for early detection of an approaching RFID transponder.

16. A method of printing, comprising:
  providing a RFID printer having a print head, a RFID reader/writer having an antenna disposed upstream of the printer head and capable of emitting an RF field, a roller to advance a longitudinally extending web of spaced RFID record members past the antenna to the printer head and beyond, and a processor capable of controlling the print head, the RFID reader/writer and the speed of advance of the web;
  calibrating the speed of advance of the web based on the spacing of the transponders and the length of the RF field wherein the calibrating comprises the steps of initiating web motion, detecting the RFID transponder in a generated RF field, counting a number of steps the RFID transponder remains in the generated RF field and determining a RF field length based on the counted number of steps wherein a step represents a physical distance, and
  advancing the web continuously in accordance with the determined web speed while the print head prints on a record member and the RFID recorder/writer encodes an RFID transponder nearly simultaneously.

17. The method of claim 16, further comprising:
  determining if the RF field is capable of encoding an RFID record member at a selected continuous web speed; and
  if the selected web speed is too high to encode the RFID transponder, determining a continuous lower web speed capable of encoding the RFID transponder or generating another method of recovery.

18. The method of claim 16, wherein the length of the RF field is greater in the upstream direction from the antenna than in the downstream direction from the antenna.

19. The method as defined in claim 16, wherein the same record member is being printed and RFID encoded nearly simultaneously.

20. The method as defined in claim 16, wherein one record member is being printed while a different record member is being RFID encoded nearly simultaneously.

21. The method as defined in claim 16, wherein there are at least three record members in the web that are being individually printed and RFID encoded nearly simultaneously.

22. A method of printing on relatively short record members, comprising:

provided a print head for printing at a printing position on a longitudinally extending web of RFID record members having RFID transponders at spaced locations along its length and an antenna disposed upstream of the print head and capable of emitting an RF field to encode the transponders, wherein each record member has a length defined by and between a leading edge and a trailing edge and at least one transponder is located between the leading and trailing edges of the record member, wherein the lengths of the record members are less than the distance between the downstream edge of the RF field and the printing position;

determining if a RF field is capable of encoding the RFID transponder at a selected continuous web speed during a calibration sequence wherein the calibration sequence comprises the steps of initiating web motion, detecting the RFID transponder in a generated RF field, counting a number of steps the RFID transponder remains in the generated RF field and determining a RF field length based on the counted number of steps wherein a step represents a physical distance encoding the transponder on a first record member while printing nearly simultaneously on a second record member, and printing at any selected place on the first encoded record member between its leading and trailing edges.

23. The method of claim 22, wherein the length of each of the first and second record members is equal to or less than 2.54 cm.

24. The RFID printer as recited in claim 1, wherein the RFID transponder is encoded anywhere between a leading edge and a trailing edge of the RFID record member.

25. The printer of claim 13, wherein the speed regulator increases the web speed based on a length of the RF field and locations of RFID transponders.

26. The method of claim 16, further including providing a selectable label-save feature.

27. The RFID printer recited in claim 1, wherein the processor is further configured to perform the steps of:

detecting if the RFID transponder failed to encode; and overstriking the RFID record member containing the failed RFID transponder at the print head.

28. The RFID printer recited in claim 1, wherein the RFID reader/writer pre-stages data before the RFID transponder is in position for encoding.

29. The RFID printer recited in claim 28, wherein the processor sends a trigger to the RFID reader/writer through a communication line when the RFID transponder reaches the RF field to write to the RFID transponder.

30. The RFID printer recited in claim 1, wherein the RFID record member includes at least two RFID transponders.

\* \* \* \* \*